US010602869B2

(12) United States Patent
Yu et al.

(10) Patent No.: US 10,602,869 B2
(45) Date of Patent: Mar. 31, 2020

(54) APPARATUS FOR AUTOMATIC MEAL PREPARATION

(71) Applicant: KITCHEN MATE INC., Toronto (CA)

(72) Inventors: Yang Yu, Toronto (CA); Yousuf Chowdhary, Maple (CA)

(73) Assignee: KITCHEN MATE INC., Toronto (CA)

(*) Notice: Subject to any disclaimer, the term of this patent is extended or adjusted under 35 U.S.C. 154(b) by 243 days.

(21) Appl. No.: 14/952,142

(22) Filed: Nov. 25, 2015

(65) Prior Publication Data

US 2016/0150915 A1 Jun. 2, 2016

Related U.S. Application Data

(60) Provisional application No. 62/085,371, filed on Nov. 28, 2014.

(51) Int. Cl.
*A47J 27/00* (2006.01)
*A47J 43/07* (2006.01)
(Continued)

(52) U.S. Cl.
CPC ........... *A47J 27/004* (2013.01); *A47J 36/321* (2018.08); *A47J 43/046* (2013.01);
(Continued)

(58) Field of Classification Search
CPC ........ A47J 27/08; A47J 36/00; A47J 36/2466; A47J 37/0623; A47J 43/046; A47J 43/06; A47J 43/07; A47J 43/0761; A47J 47/01; A47J 27/0802; A47J 36/32; A47J 27/004; A47J 44/00; A23L 11/00; A23L 5/10; A23L 5/13; A23L 5/15; A23L 27/14;
(Continued)

(56) References Cited

U.S. PATENT DOCUMENTS 4,230,066 A * 10/1980 Lents .................... A47J 37/042
118/20
5,329,919 A * 7/1994 Chang ................. A47J 37/0623
126/21 A
(Continued)

OTHER PUBLICATIONS

"EveryCook—Let IT cook for you!", downloaded from web site http://everycook.org/ on Dec. 14, 2015.
(Continued)

*Primary Examiner* — Serkan Akar
*Assistant Examiner* — Chris Q Liu
(74) *Attorney, Agent, or Firm* — Moser Taboada

(57) ABSTRACT

An automatic meal preparation apparatus is provided which has a top section with compartments for raw food and at least one spice/sauce cartridge; a middle section with a cooking vessel; and a bottom section with a heating element. The sections are stacked in series within a housing. The compartments of the top section are disposed above the cooking vessel. The cooking vessel is in communication with the heating element. A controller receives a selection of a recipe from a user, and executes instructions of the recipe to selectively heat the heating element at certain times, and selectively dispense at least a portion of the raw food and a pre-determined measure of spice/sauce. The apparatus stirs and cooks the food and the spice/sauce in the vessel for a specified duration, in accordance with the recipe.

22 Claims, 21 Drawing Sheets

(51) Int. Cl.
*A47J 43/046* (2006.01)
*A47J 44/00* (2006.01)
*A47J 36/32* (2006.01)
*A47J 43/044* (2006.01)

(52) U.S. Cl.
CPC ............ *A47J 43/0761* (2013.01); *A47J 44/00* (2013.01); *A47J 2043/04454* (2013.01); *A47J 2043/0733* (2013.01); *A47J 2203/00* (2013.01)

(58) Field of Classification Search
CPC .. A23L 35/00; B05C 3/02; B05C 3/10; G05B 15/02; G06F 21/31; G06F 21/64
USPC ..... 99/326, 327, 348, 331, 357, 423, 443 R, 99/468, 332, 342, 325–334, 352–355, 99/341, 485, 486; 426/231, 106, 115, 426/392, 416, 508, 523, 87; 219/543, 219/682, 702
See application file for complete search history.

(56) References Cited

U.S. PATENT DOCUMENTS

| | | | | |
|---|---|---|---|---|
| 5,819,636 | A * | 10/1998 | Khashoggi | A47J 27/14 366/146 |
| 6,843,166 | B1 * | 1/2005 | Li | A47J 27/14 99/327 |
| 2006/0263501 | A1 * | 11/2006 | Oghafua | A47J 27/004 426/523 |
| 2009/0212044 | A1 * | 8/2009 | Stanton | A47J 27/62 219/682 |
| 2014/0227411 | A1 * | 8/2014 | Popeil | A47J 37/1209 426/302 |
| 2014/0322417 | A1 | 10/2014 | Kim | |
| 2016/0081515 | A1 | 3/2016 | Aboujassoum et al. | |

OTHER PUBLICATIONS

"Sereneti Kitchen", downloaded from web site http://www.sereneti.com/ on Dec. 14, 2015.

"Mijoteur Moulinex CE7038 Cookeo Connect Smart Noir (4054075)", downloaded from web site http://www.darty.com/nav/ach.et/perit_electromenager/cuisson_quotidienne-culseur_molioteur/mlioteur/moulinex_ce7038.hmtl on Dec. 14, 2015.

"Multicuiseur Intelligent Cookeo USB—Moulinex", downloaded from web site http://www.moulinex.fr/Cuisson/Cookeo-%26-Multicuiseure/Cookeo-Usb/p/7211001368 on Dec. 14, 2015.

* cited by examiner

APPARATUS FOR AUTOMATIC MEAL PREPARATION

FIELD OF INVENTION

The invention in general relates to cooking devices and more particularly relates to devices for automatic meal preparation.

BACKGROUND OF THE INVENTION

For some people cooking is a chore, as they struggle to find ways to feed themselves and their families nutritious food without spending ages in the kitchen.

There are many good reasons to cook meals from scratch. Cooking simply at home from whole ingredients is often cheaper than even fast food restaurants. Food made at home usually has far less salt and fat than either processed food or ready to eat frozen meals.

Multiple factors are impacting people's perception about cooking at home. Raw ingredients are more expensive than frozen dinners. It takes time and effort to buy the raw produce, imagine what to cook, determine the recipe, and then actually cook it.

Many people are too busy and do not have the time or imagination to cook. They are hooked on fast food restaurants that offer fast and cheap meals. People have lost the skills and will to cook healthy meals from scratch.

People are more accustomed to a wider selection of food options and have a more varied palate now than a few decades ago. When they cook at home, they expect to have a similar variety of diverse cuisines with exotic ingredients.

Making food quickly and well can be easy once one has mastered how to cook; but it is a learned skill, the acquisition of which takes time, practice, patience and the acceptance of mistakes. To cook whole foods at a pace that can match box-meal offerings, one needs to know how to make substitutions on the fly; how to doctor a dish that has been oversalted or overspiced; how to select produce and know how long one has to cook it for, amongst other variables.

Mistakes are a natural part of learning to cook, but they can cost a person time, ingredients, and money without actually feeding anyone. A botched recipe can make the expensive ingredients inedible. Too many mistakes can also make a persuasive case that cooking is not worth the trouble and that Hamburger Helper is worth the cost. Therefore without these skills, cooking from scratch becomes a risky business.

Slow cooker devices are known, which allow a person to assemble all the ingredients then just leave them to cook while they do other things. A slow cooker, also known as a Crock-Pot (a trademark), is a countertop electrical cooking appliance that is used for simmering, which requires maintaining a relatively low temperature (compared to other cooking methods such as baking, boiling, and frying), allowing unattended cooking for many hours of pot roasts, stews, soups and other suitable dishes, including dips, desserts and beverages. A basic slow cooker consists of a lidded round or oval cooking pot made of glazed ceramic or porcelain, surrounded by a housing usually made of metal, containing an electric heating element. The lid is often of glass seated in a groove in the pot edge.

A slow cooker is designed to cook while no one is there to care for it, thus allowing a cook to fill the pot with the required ingredients and come back several hours later to a ready meal. Raw food and a liquid (such as water or stock) are placed in the slow cooker. Some recipes call for preheated liquid. The cooker lid is put on and the cooker is switched on. Some cookers automatically switch from cooking to warming (maintaining the temperature at 71-74° C. [160-165° F.]) after a fixed time or after the internal temperature of the food, as determined by a probe, reaches a specified value. Thus a slow cooker allows a person to start dinner cooking in the morning before going to work and finish preparing the meal in the evening after work. But, one still must know how to cook, which spices to add, what quantities of spices to add in order to make a meal using a slow cooker.

A slow cooker is handy for making some kinds of recipes like soups and stews that require an elongated slow cooking period, but it has a limited repertoire. The long, moist cooking is not suitable for food items that are meant to remain crisp and fresh, as a slow cooker can leave food mushy by overcooking it. This process can also destroy nutrients particularly from vegetables due to enzyme action during cooking and due to heat degradation.

More recently, multi-cooker devices have become available, which although allowing for multiple cooking processes (e.g. baking or stewing), have many of the same drawbacks as slow cookers. Among the drawbacks is a lack of freshness or "à la minute" preparation of food ingredients. Such devices are not suited, for example, to stir-fried, poached, or steamed preparations, which require precise timing and precise exposure of ingredients to short heating durations, and/or exposure of different ingredients to different amounts or durations of heat (e.g. onions vs. carrots).

It would be desirable to have an automated meal preparation apparatus that would allow cooking from whole ingredients using an easy, cost-effective and healthy process.

SUMMARY

Broadly speaking, the invention provides a system and a method of automatic meal preparation that allows for an "eating without having to cook" experience—cooking from whole ingredients in a way that is easy, cost-effective and healthy.

The automatic meal preparation apparatus allows for preparing different recipes from various cuisines by using spices that are supplied in removable cartridges. The automatic meal preparation apparatus is preferably computer assisted for controlling the time of cooking, intensity of heat, amount of spices, combination of spies, timing when individual raw ingredients are added to the cooking pot, and stirring timing, speed, and duration using a stirring arm.

According to an aspect of the invention, an automatic meal preparation apparatus is provided. A top section is provided that has a first compartment for receiving raw food to be prepared, and a second compartment for containing at least one spice/sauce cartridge which has at least one spice/sauce. A middle section is provided that has a cooking vessel, and a stirring arm disposed in the cooking vessel. A bottom section is provided that has a heating element and an actuator for driving the stirring arm. The top, middle and bottom sections are stacked in series within a housing, such that the compartments of the top section are disposed above the cooking vessel and are in selective communication therewith. The cooking vessel is in communication with the heating element of the bottom section. A controller is provided in the housing that is programmed to receive a selection of a recipe from a user, and execute instructions of the recipe for selectively heating the heating element at pre-determined times, selectively dispensing at least a portion of the raw food by releasing the pre-determined measure from the first compartment into the cooking vessel at a pre-determined time, dispensing a pre-determined measure of spice/sauce from at least one of the spice/sauce cartridges by releasing it from the second compartment into the cooking vessel at a pre-determined time, and stirring and cooking the food and the spice/sauce in the vessel for a specified duration, in accordance with the recipe.

Preferably, the at least one spice/sauce cartridge is removable or replaceable. The at least one spice/sauce cartridge is preferably pre-filled with a quantity of spice or sauce (which may be in pre-measured doses). Preferably, the at least one spice/sauce cartridge includes more than one pre-determined measure.

The measure may be selectable by the user (e.g. to adjust the relative spiciness of the dish according to personal preference).

Preferably, the first compartment has multiple segments with each segment having space for receiving a different raw food. Preferably, each segment is separately dispensable into the cooking vessel.

The apparatus preferably also includes a water tank or reservoir in the housing that is in communication with the cooking vessel (e.g. for providing steam and/or cooking water to a dish).

Preferably, the housing is round, and the first and second compartments are concentric with each other. In this case, at least one of the first or second compartments may be rotatable for better alignment with the cooking vessel.

The cooking vessel may be rotatable for better alignment with the first or second compartment to be dispensed.

Preferably, at least one of the top, middle and bottom sections is ventilated, and more preferably, the entire apparatus is ventilated (e.g. having an air inlet through or near the bottom section, and at least one air flow column through the dispensing racks and compartments exiting through an upper vent or outlet in a lid of the top section). The ventilation may be assisted.

An access door may be provided on the middle section. An access lid may be provided on the top section. Preferably, the access lid includes a fan. At least one of the access door or access lid may be locked while cooking is in progress.

Various designs of cooking pots or vessels are possible. Preferably, the cooking vessel has a handle. The handle may be anchorable with the middle section or the bottom section (or other means of anchoring the cooking vessel may be provided—apart from the handles). Preferably, the stirring arm of the cooking vessel is actuated by a motor in the bottom section.

Preferably, the heating element is an induction element, and the cooking vessel includes an induction-compatible material. For example, the cooking vessel may be of a metallic material (that is induction-compatible).

The controller (which may be a system of discrete components or modules, rather than a single unit) may include at least one sensor for detecting an unsafe operating condition in the housing. In the event such a condition is detected, the controller may be programmed to automatically shut off all or some powered functions of the apparatus.

A pre-filled spice/sauce cartridge for the automatic meal preparation apparatus is also provided. The cartridge has a cylindrical or tapered cylindrical body pre-filled with a spice or sauce. The body has an open top. A lid or seal is provided that substantially covers the open top of the body. The body also includes a dispensing outlet on a bottom surface of the body, which allows spice or sauce from the cartridge to be dispensed.

The cartridge may also include a readable code on the body that is readable by the apparatus to identify the spice or sauce.

In certain embodiments, the body may include divisions or portions sized to provide dispensable measures.

Alternatively, or in addition, the dispensing outlet may include a valve calibrated to release a measure or sub-measure quantity of the spice or sauce at a time.

To use the apparatus, a user places prepared spice/sauce cartridges in the spice rack and places it in the automatic meal preparation apparatus. The user selects a recipe from a list e.g. using a user interface that may be driven by controls like buttons on the automatic meal preparation apparatus.

In one embodiment the apparatus may be able to interact with an app installed on a device. Such devices may include but are not limited to a mobile device for example a Smartphone, tablet, personal data assistant (PDA), game device, e-reader, a personal computer, a server, a laptop, a tablet computer, network appliance, set-top box, SmartTV, embedded device, computer expansion module, any appliances having internet or wireless connectivity. Preferably the app of the invention has the capability to connect to the internet and also provides a user an interface using which the user may be able to select a recipe for meal preparation.

The user may be asked to select a portion size e.g. meal for 2 persons, 4 persons, etc. The user is asked to put the required raw ingredients into the raw ingredient rack, possible in a specified order, one at a time (e.g. first sub-compartment onions, second sub-compartment carrots, third sub-compartment chicken).

The user may be able to set a delay timer so that the meal can be prepared at a later time. For example prepare the meal in 2 hours or prepare the meal for 6 pm in the evening.

Once the recipe (and any optional parameters) has been selected and the ingredients are in place, the apparatus can begin the automatic meal preparation process. Preferably the apparatus runs a self-check routine. The self-check may include multiple steps that may be executed before the automatic meal preparation initiates. For example ensuring that all lids/doors are closed, that the apparatus is stable and on a flat surface, that the spice rack and spice/sauce cartridges are in place, that the cooking pot or vessel is present and correctly placed, and that any water or oil reservoirs have a minimum reserve.

The apparatus may also check that the spice levels in the required spice/sauce cartridges are above critical and sufficient to prepare the chosen recipe and chosen portion size.

The apparatus may also check to see that the user has placed the correct weights/amounts of the raw ingredients in the raw ingredient rack according to the portion size selected. If too much or too little is detected, the user may be signalled or instructed to add/remove raw ingredient quantities as necessary.

DETAILED DESCRIPTION

Figure 1:
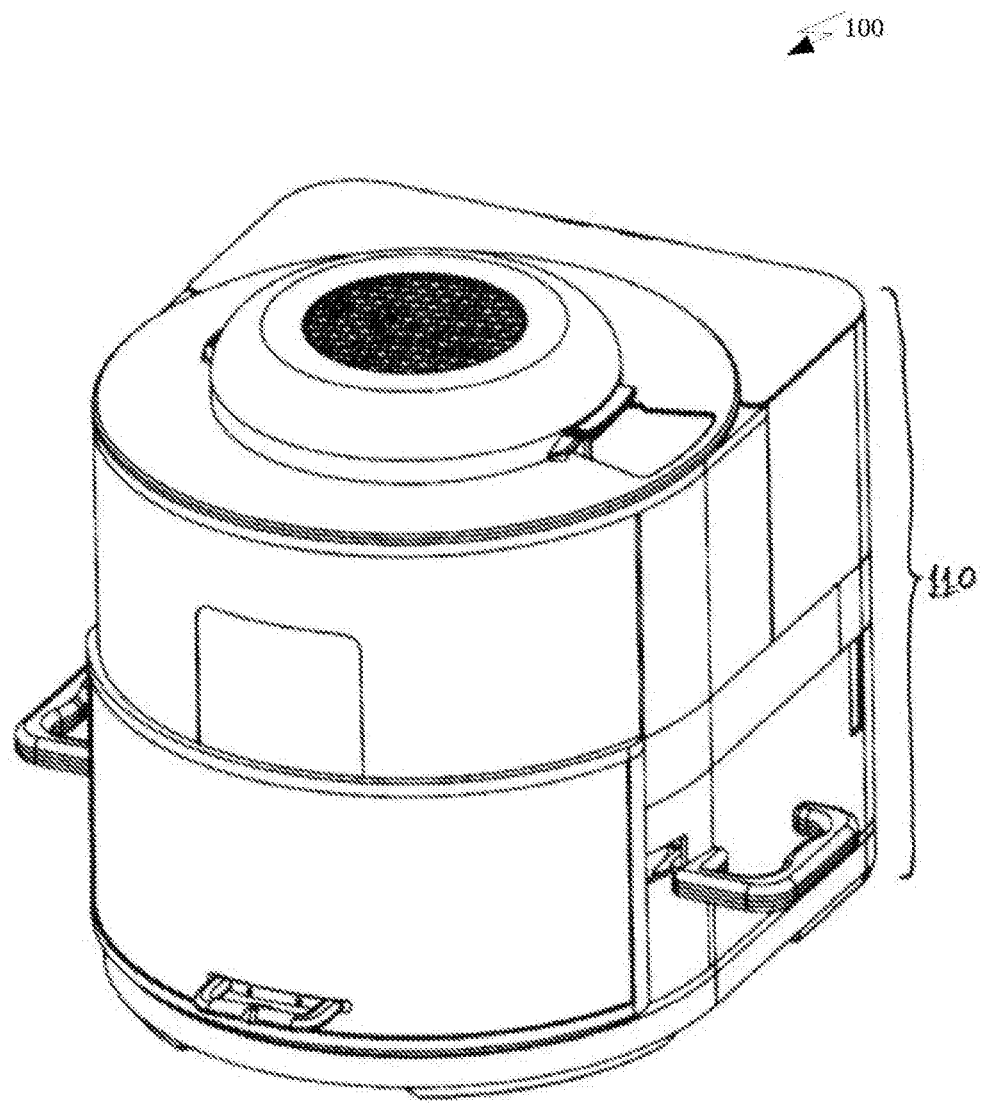
FIG. 1 is a perspective view of a preferred embodiment of the meal preparation apparatus.

Before embodiments of the invention are explained in detail, it is to be understood that the invention is not limited in its application to the details of the examples set forth in the following descriptions or illustrated drawings. It will be appreciated that numerous specific details are set forth in order to provide a thorough understanding of the exemplary embodiments claimed herein. However, the embodiments described herein may be practiced without these specific details. In other instances, well-known methods, procedures and components have not been described in detail so as not to obscure the embodiments described herein.

Before embodiments of the hardware and software modules or flow charts are described in detail, it should be noted that the invention is not limited to any particular form or shape or software language described or implied in the figures and that a variety of alternative software languages may be used for implementation of the invention.

It should also be understood that certain software components and items are illustrated and described as if they were hardware elements, and vice versa. However, it will be understood that the intent is not to limit the form and physical architecture of programming or instructional components.

As will be appreciated by one skilled in the art, aspects of the present invention may be embodied as a system, method or computer program product. Accordingly, these aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, these aspects may take the form of a computer program product embodied in any tangible medium of expression having computer usable program code embodied in the medium.

Computer program code for carrying out certain operations in the present invention may be written in any combination of one or more programming languages, including an object oriented programming language such as Java, Smalltalk, C++ or the like and conventional procedural programming languages, such as the "C" programming language or similar programming languages. Computer code may also be written in dynamic programming languages that describe a class of high-level programming languages that execute at runtime many common behaviours that other programming languages might perform during compilation. JavaScript, PHP, Pen, Python and Ruby are examples of dynamic languages.

The embodiments of the systems and methods described herein may be implemented in hardware or software, or a combination of both. However, preferably, any computer programs described execute on at least one programmable computer which comprises at least one processor, a data storage system (including volatile and non-volatile memory and/or storage elements), and at least one communication interface. A computing device may include a memory for storing a control program and data, and a processor (CPU) for executing the control program and for managing the data, which includes user data resident in the memory and includes buffered content. The computing device may be coupled to a video display such as a television, monitor, or other type of visual display, or another device which has a visual display incorporated in it (iPad, iPhone etc.). An application or an app or other simulation may be stored on a storage media such as a DVD, a CD, flash memory, USB memory or other type of memory media or it may be downloaded from the internet. The storage media can be coupled with the computing device where it is read and program instructions stored on the storage media are executed and a user interface is presented to a user. For example and without limitation, the programmable computer(s) may be a server, network appliance, set-top box, SmartTV, embedded device, computer expansion module, personal computer, laptop, tablet computer, personal data assistant, game device, e-reader, or mobile device for example a Smartphone. Other devices include appliances having internet or wireless connectivity and onboard automotive devices such as navigational and entertainment systems.

The program code may execute entirely on the apparatus of the invention, or in combination with a mobile device or partly on the mobile device as a stand-alone software package; partly on the mobile device and partly on the apparatus of the invention or partly on the apparatus of the invention and partly on a remote server; or any combination thereof. The remote computer may be connected to the apparatus of the invention via the internet or may be connected to the mobile device through any type of network, including a local area network (LAN) or a wide area network (WAN), or the connection may be made to the internet through a mobile operator network (e.g. a cellular network).

FIG. 1 shows a preferred embodiment of the automatic meal preparation apparatus 100 which is capable of preparing different recipes from various cuisines. The apparatus 100 is preferably in a compact overall housing 110 suitable for countertop use. The automatic meal preparation apparatus 100 is computer assisted for providing a no hassles experience to the user when preparing a meal.

Figure 2:
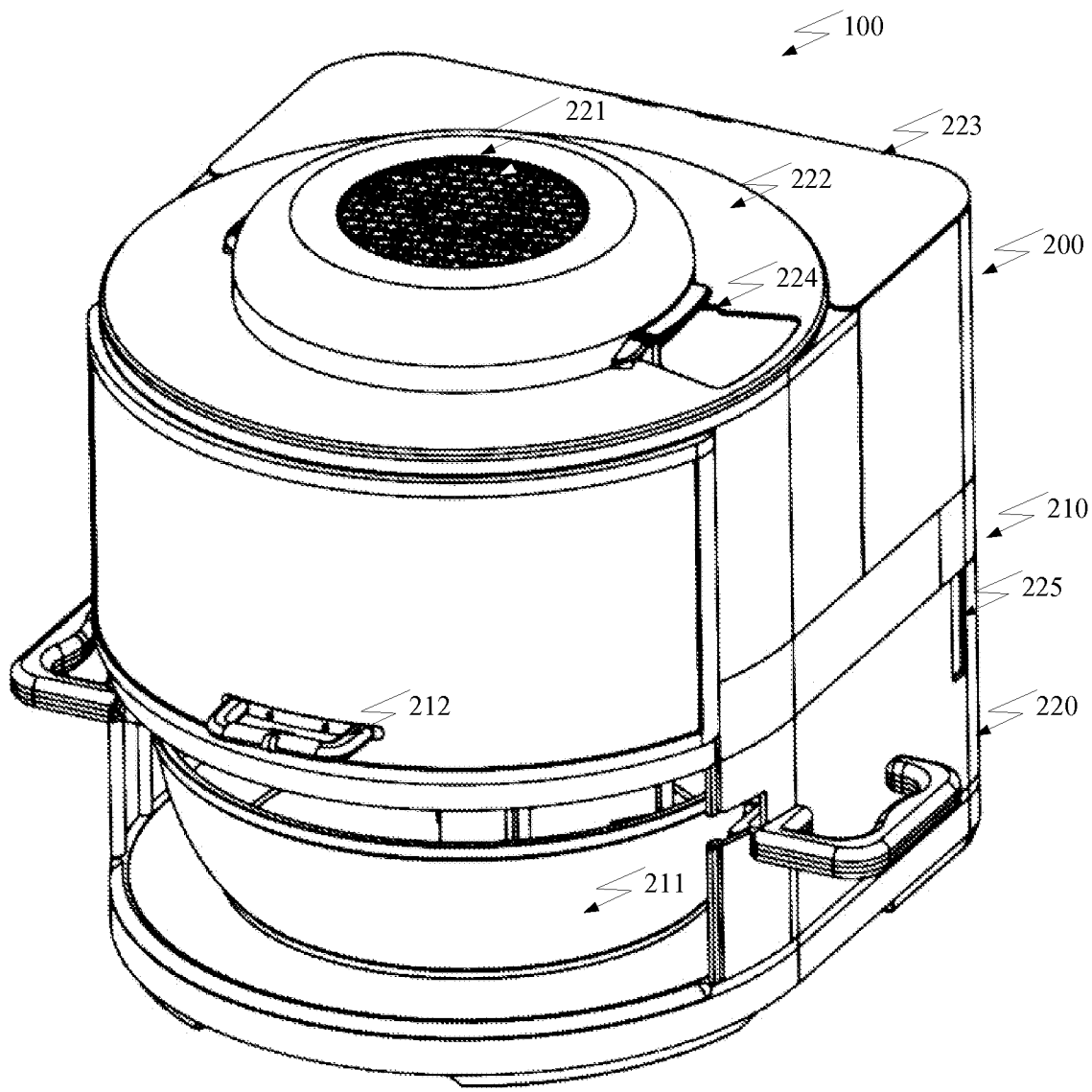
FIG. 2 is a view of the apparatus with middle door open.

FIG. 2 shows the automatic meal preparation apparatus 100 that includes 3 sections, and each section has one or more components. Top section 200 is the top portion of the meal preparation apparatus 100.

The middle section 210 is the hollow section of the meal preparation apparatus 100. FIG. 2 also shows some of the components of the middle section 210. The middle section 210 is a hollow housing that provides space for the placement of a cooking pot or vessel 211 for preparing the meal automatically. The middle section 210 has a door 212 that can be opened to access the hollow space to place the cooking pot inside the apparatus. The door 212 can be closed and may automatically lock when the meal is being automatically prepared.

Section 220 is the bottom section of the automatic meal preparation apparatus 100. The bottom section 220 houses various components including the electronics for controlling the various functions of the automatic meal preparation apparatus and induction coils for inducing heat in the metallic pot.

Figure 3:
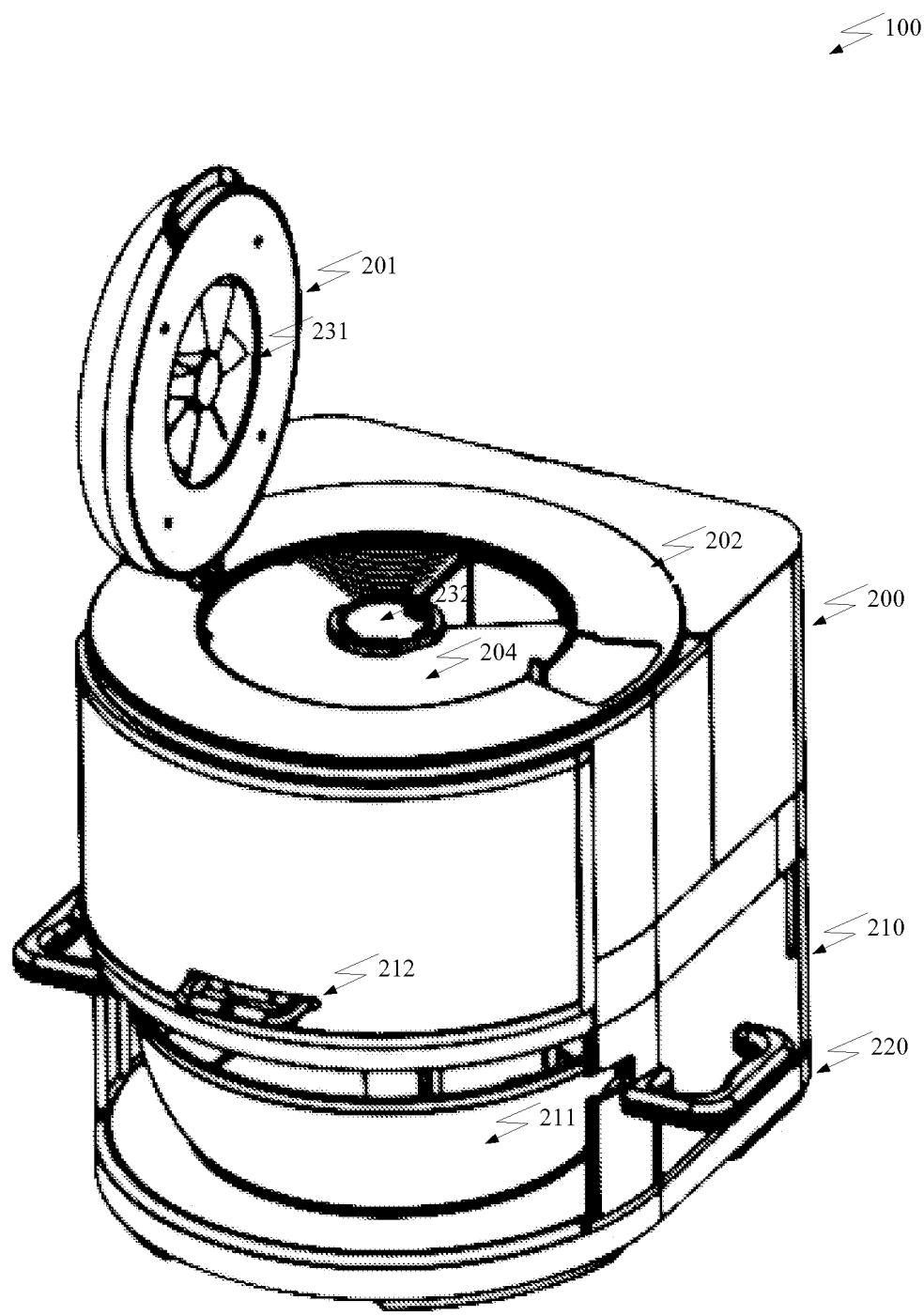
FIG. 3 is a view of the apparatus with middle door and lid open.

FIG. 3 shows the automatic meal preparation apparatus 100; top section 200 is shown with its lid 201 open. The lid 201 is openable and provides access to raw ingredients compartment 204. A spice rack 202 is also provided, which houses the different spice/sauce cartridges 203 from which spice can be dispensed into the cooking pot or vessel 211.

The top section 200 provides space where a removable spice rack 202 can be placed. The spice rack 202 provides space where several spice/sauce cartridges 203 can be placed. Each spice/sauce cartridge 203 many contain a different spice. In one embodiment, the top section 200 has a mechanical mechanism for rotating the spice rack 202 so that different spices can be dispensed into the cooking pot or vessel 211. The top section 200 may also provide a spice recognition system for identifying the right spice before dispensing it. The top section 200 may also contain a raw ingredients placement compartment 204 that may be divided into multiple sub-compartments or segments for placement of raw food before cooking; the sub-compartments can then be selectively emptied into the pot. The spice rack 202 and the raw ingredients placement compartment 204 are preferably separately rotatable. In one embodiment the electronics for controlling the different components of the top section 200 may be placed in the bottom section 220. In another embodiment the electronics for controlling the different components of the top section 200 may be placed in the top section 200.

Figure 4:
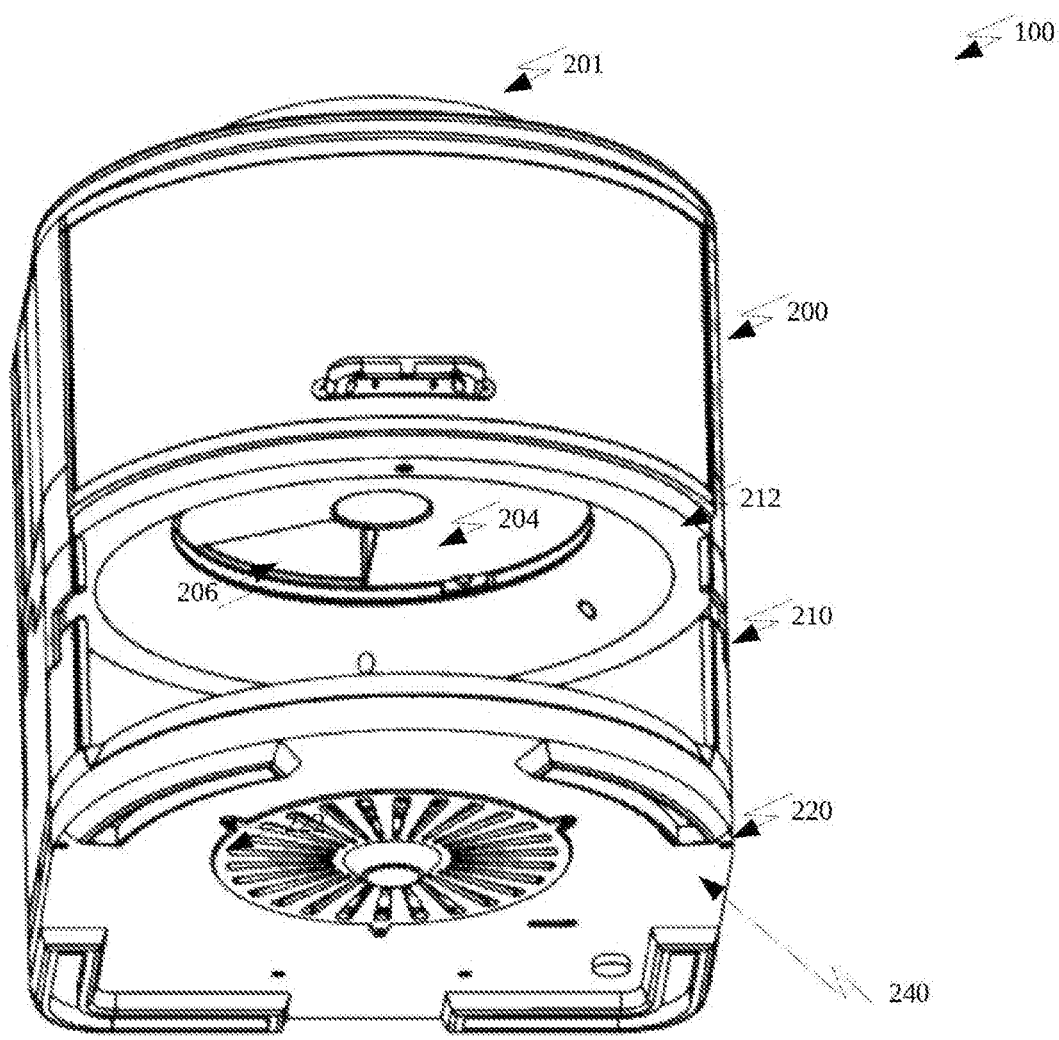
FIG. 4 is an underside perspective view showing ventilation slots.

FIG. 4 shows the automatic meal preparation apparatus 100 from bottom up. Top section 200 is shown with its lid 201. The raw ingredients rack 204 in the top section 200 has an opening 206 at the bottom through which raw ingredients placed in the raw ingredients rack 204 can be dispensed into the cooking pot 211.

FIG. 4 shows the middle section 210 where the cooking pot or vessel 211 is placed (removed in this view) for preparing the meal automatically. Door 212 preferably locks when a meal is being prepared.

FIG. 4 also shows the underside of the bottom section 220 which includes an air intake opening 222.

Figure 5:
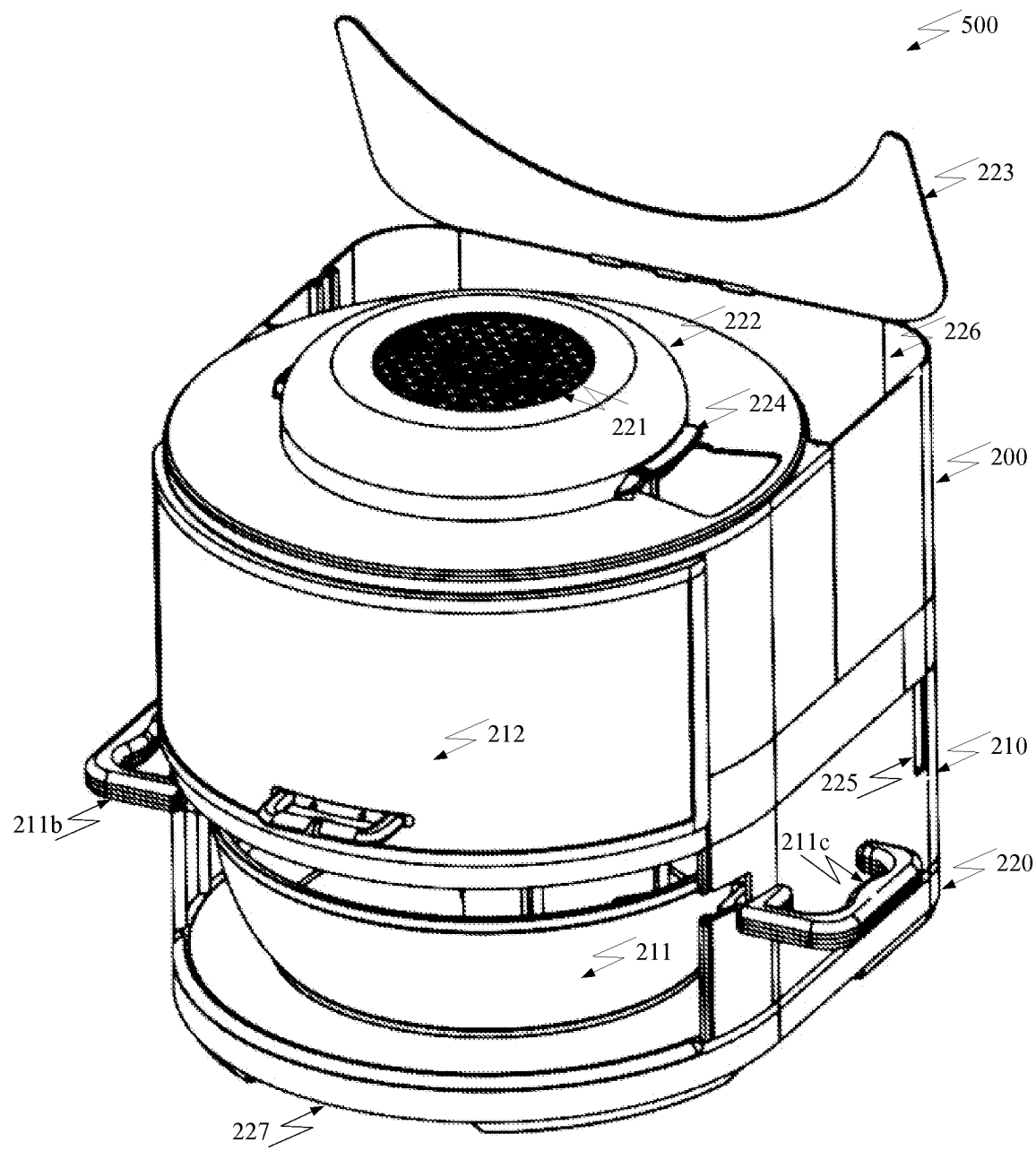
FIG. 5 is a view showing water reservoir open.

FIG. 5 shows a perspective view 500 of the automatic meal preparation apparatus 100 positioned to better illustrate the water reservoir 226.

FIG. 5 shows the middle section 210 where the cooking pot or vessel 211 is placed for preparing the meal. The middle section 210 door 212 is shown open. Door 212 which would ordinarily cover open section of the middle section 210 is shown raised into open position in this view.

The water reservoir 226 component is closed with with cover lid 223. This reservoir supplies water to the cooking chamber of the middle section for steaming, or to add water to the cooking vessel 211. (Note that certain embodiments may also include an oil reservoir for frying applications, not shown. Alternatively, oil may be included as a spice/sauce in one of the spice/sauce cartridges, not shown in this view.)

Aspects of the ventilation system are also shown. Air enters the apparatus through vents around area 227 and through intake 222 (see FIG. 4). Air flows generally upward through the housing at a central column 232 to exit through lid vent 221 in lid 222. The lid is openable through latch 224. As shown in FIG. 3, fan 231 may be provided in vented lid 201. Fan 231 communicates with exterior vent 221 shown in FIG. 5. FIGS. 3 and 4 also illustrate the interior central air column 232 which runs through the apparatus. The electronics may be ventilated separately through unit 225 as shown in FIG. 5.

Figure 6:
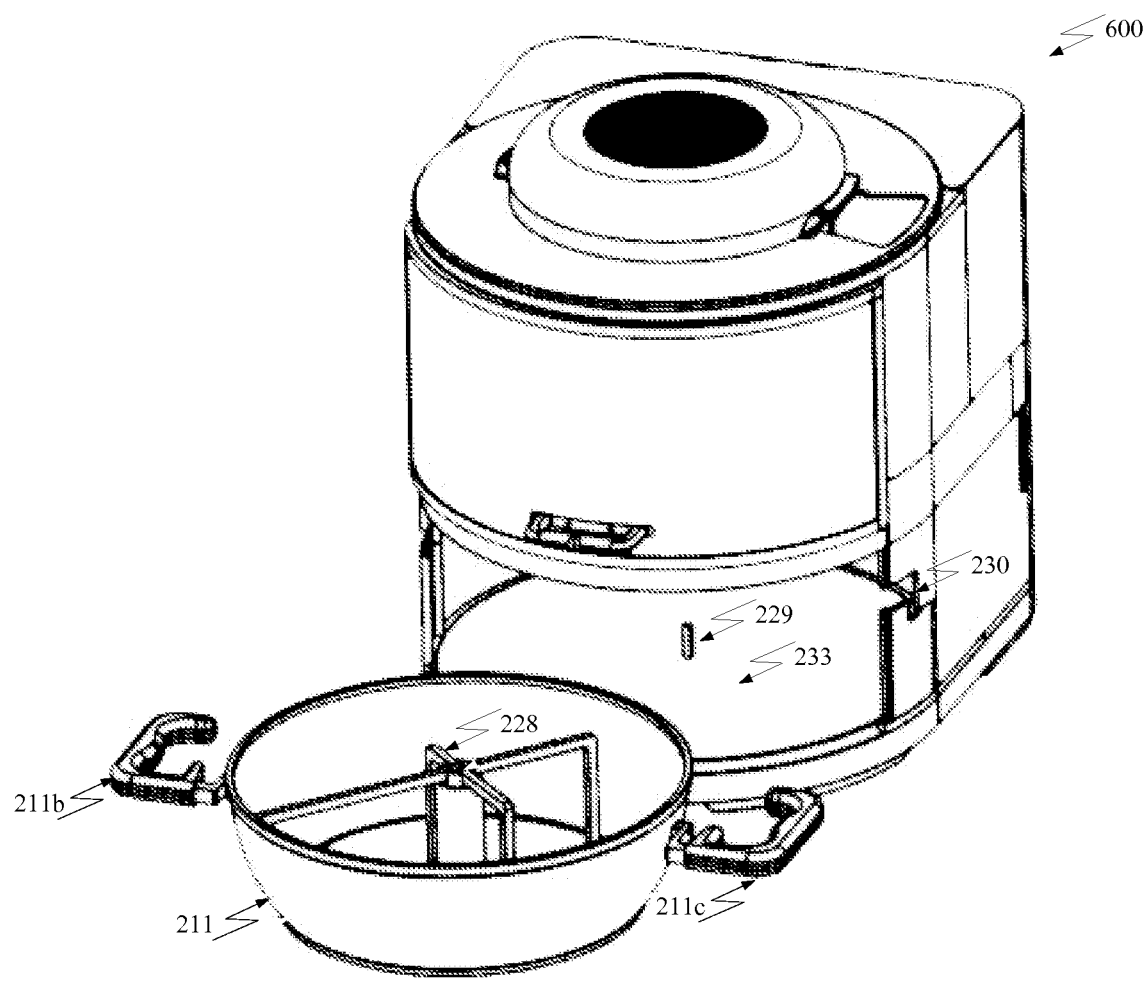
FIG. 6 is a view with cooking vessel removed to show stirring arm detail.

FIG. 6 shows a perspective view 600 of the automatic meal preparation apparatus 100 with cooking vessel 211 pulled out to show detail.

As illustrated, the cooking vessel 211 preferably includes a stirring arm 228. The stirring arm is mounted on post 211a in the cooking vessel. When in position, the assembly engages slot 229 which connects the stirring arm to a motorized drive system to rotate the arm in clockwise or counterclockwise direction at set speeds. The anchoring system uses handles 211b, 211c to lock into L-shaped slots 230. When in position, the cooking vessel is in communication with cooktop 233.

Figure 7:
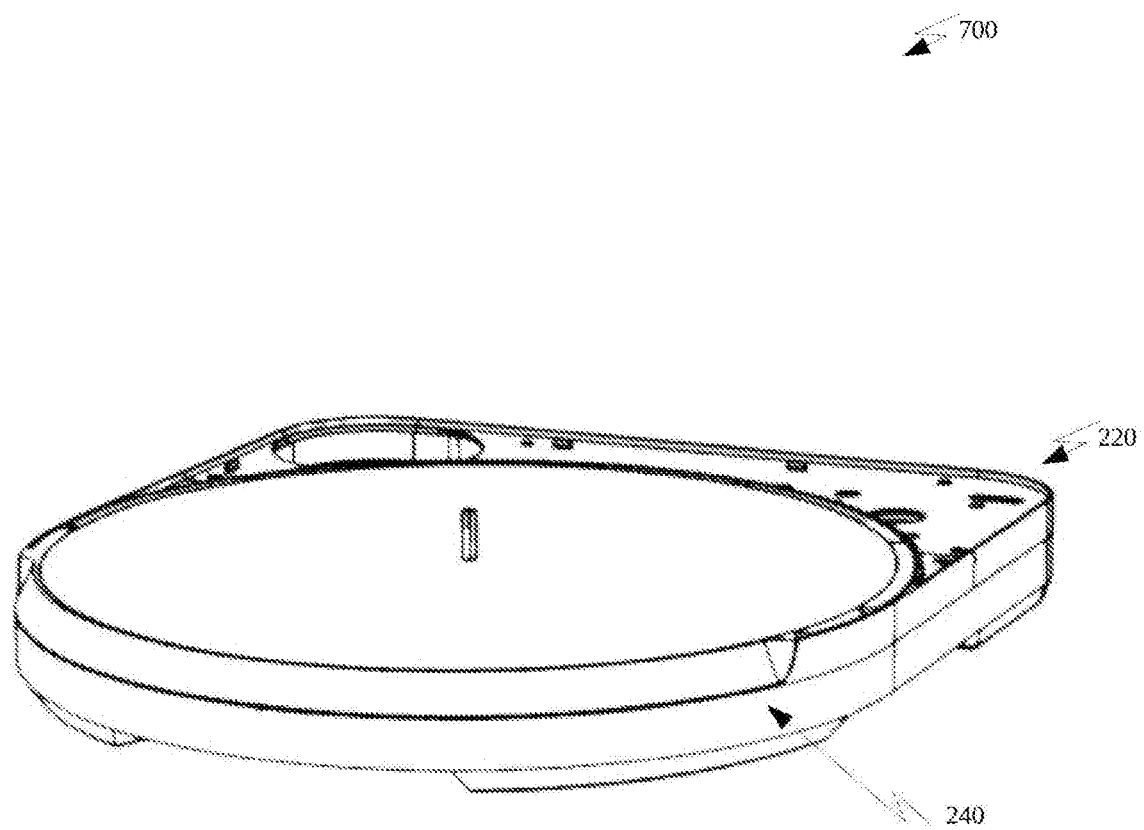
FIG. 7 is a view of just the bottom section.

FIG. 7 shows a view 700 of the automatic meal preparation apparatus 100 with the top section 200 and the middle section 210 removed. Thus FIG. 7 shows the bottom section 220 only. Induction cooktop 233 is provided which through internal induction coils (not shown) induces heat in the cooking vessel 211 (not shown in this view).

Bottom section 220 preferably houses the electronics for controlling the apparatus (i.e. controller 240), induction coils for heating the food items to be cooked, and the mechanical system for actuating the stirring arm.

The induction heating coils placed within the bottom section 220 are so designed that they are suitable for cooking at various temperatures for various durations. The induction heating coils are advantageously placed so that when the cooking pot or vessel 211 is placed on cooktop 233, heat is evenly induced in the entire surface of the cooking pot or vessel 211. Materials that are induction-compatible are particularly preferred for the cooking pot or vessel 211, and metallic materials are particularly preferred.

Figure 8:
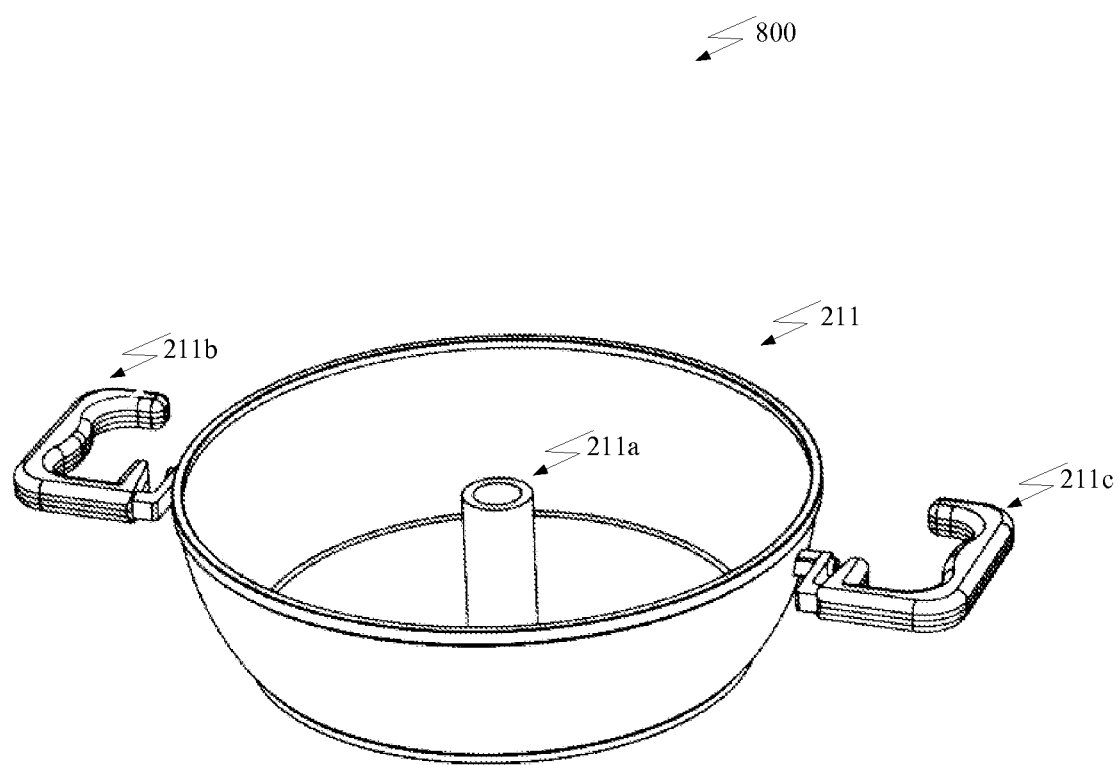
FIG. 8 is a front view of a cooking vessel for the apparatus (stirring arm removed).

FIG. 8 shows one embodiment 800 of the cooking pot or vessel 211. The cooking pot or vessel 211 may have a relatively deep frying pan configuration with a flat bottom and a flat top that is open.

The cooking pot or vessel 211 may also have two or more handles 211b and 211c that provide a means for holding the pot when placing it inside the automatic meal preparation apparatus or when taking it out with the prepared meal. The handles 211b and 211c may also act as a securing mechanism and allow for the placement of the pot securely inside the automatic meal preparation apparatus. The handles 211b, 211c may engage slots 230 when in position.

As shown in FIG. 6, the cooking pot or vessel is preferably stirred by a stirring arm 228 so that the meal ingredients can be gently and continuously circulated (in either direction, or intermittently in opposing directions). The stirring arm 228 is preferably mounted in the cooking vessel using post 211a.

Figure 9:
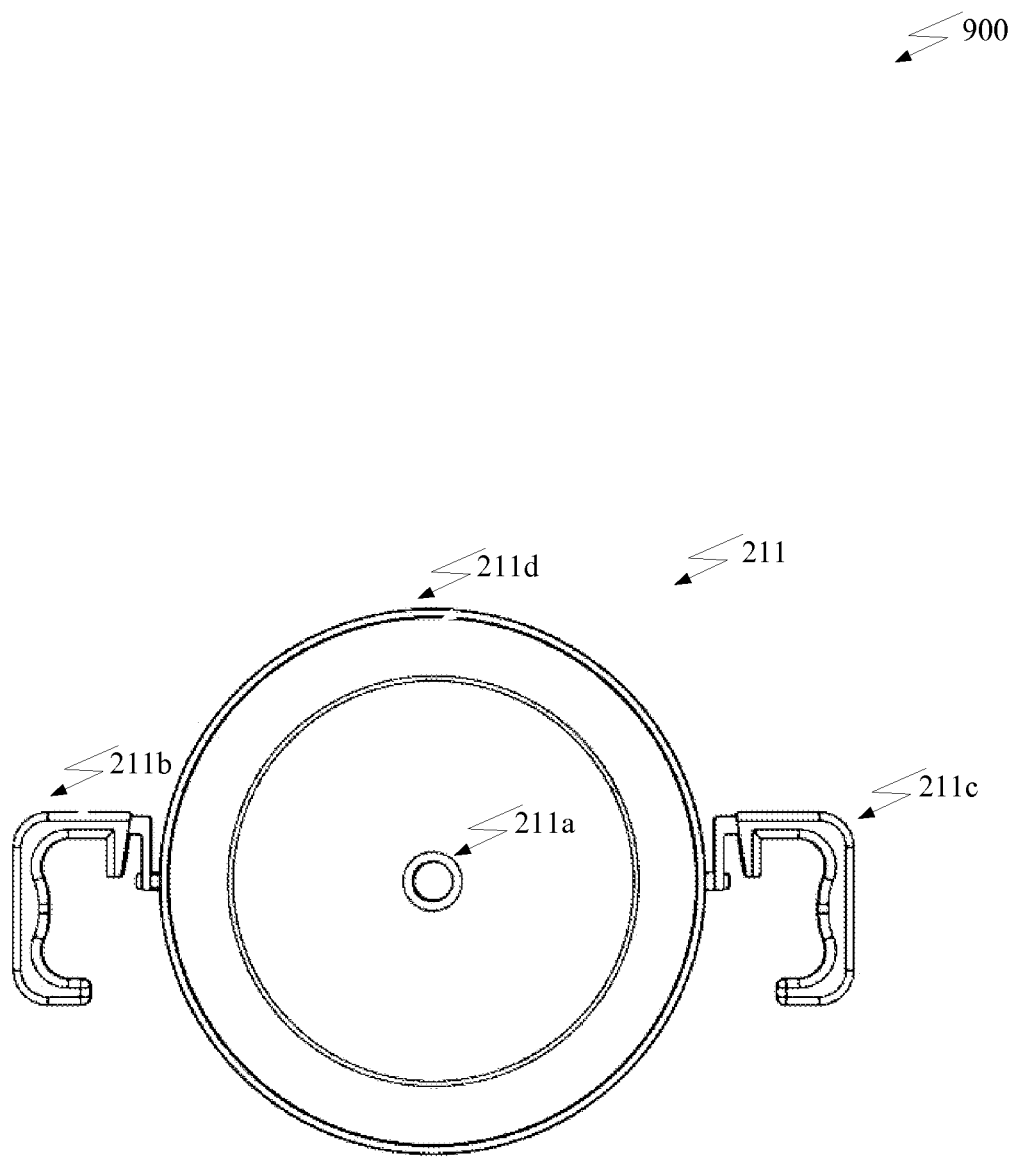
FIG. 9 is a top view of the cooking vessel showing handle portions.

FIG. 9 shows a top view 900 of the cooking pot or vessel 211. The cooking pot or vessel 211 also has two or more handles 211b and 211c that allow for a means for holding the pot when placing it inside the automatic meal preparation apparatus or when taking it out with the prepared meal.

The cooking pot or vessel 211 preferably has a flat bottom 211d that smoothly contacts cooktop 233 of the bottom section of the automatic meal preparation apparatus to allow for even cooking.

Figure 10:
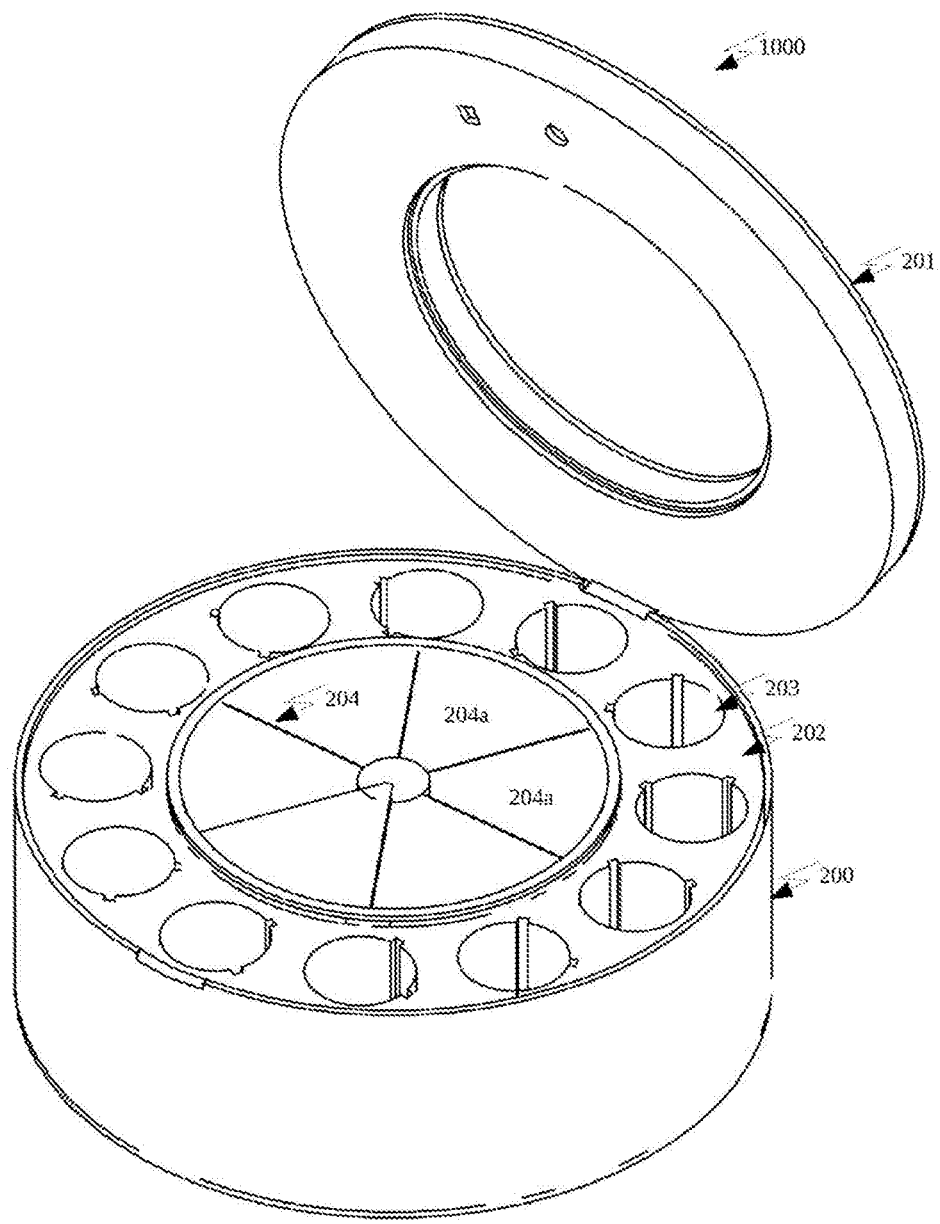
FIG. 10 is a perspective view of the top section opened to show raw food and spice/sauce compartments.

FIG. 10 shows one embodiment 1000. The top section 200 has several sub-components. The top section 200 preferably includes a spice rack 202 which has several spice/sauce cartridges 203 and a raw ingredients rack 204 for receiving raw ingredients before the meal preparation.

Top section 200 may provide a mechanical mechanism for rotating the spice rack 202 to dispense the right spice, a spice recognition system for identifying the right spice, and a raw ingredient rack 204 which has several sub-compartments for placement of raw food before cooking. The sub-compartments are selectively releaseable into the cooking pot or vessel.

The spice rack 202 may have several removable spice/sauce cartridges 203 that are filled with particular spices or sauces. A computer controlled rotatable mechanism may be provided for the selection and metered dispensing of spice/sauce from a spice/sauce cartridge above the cooking pot. The computer controlled spice dispensing mechanism allows for the precise measurement and dispensing of the spice in the right amount, right combination and at the right time when automatically preparing a meal according to the selected recipe.

The top section 200 may also have a spice recognition system that is computer controlled so that the spice/sauce cartridge can be automatically recognized and selected before the spice is dispensed into the cooking pot. There may preferably also be a spice level measurement mechanism so that the level of spices can be checked before the meal preparation process is initiated (e.g. by weight).

The top section 200 also preferably has a raw ingredient rack mounted on a circular housing which is divided into several individual compartments (segments 204a) shaped like wedges.

The top section 200 may also have a lid 201 with a locking mechanism. Once the meal preparation process initiates the top lid 201 may be locked for safe operation so that the spice rack, the spice/sauce cartridges and the raw ingredients rack are inaccessible to a user.

Figure 11:
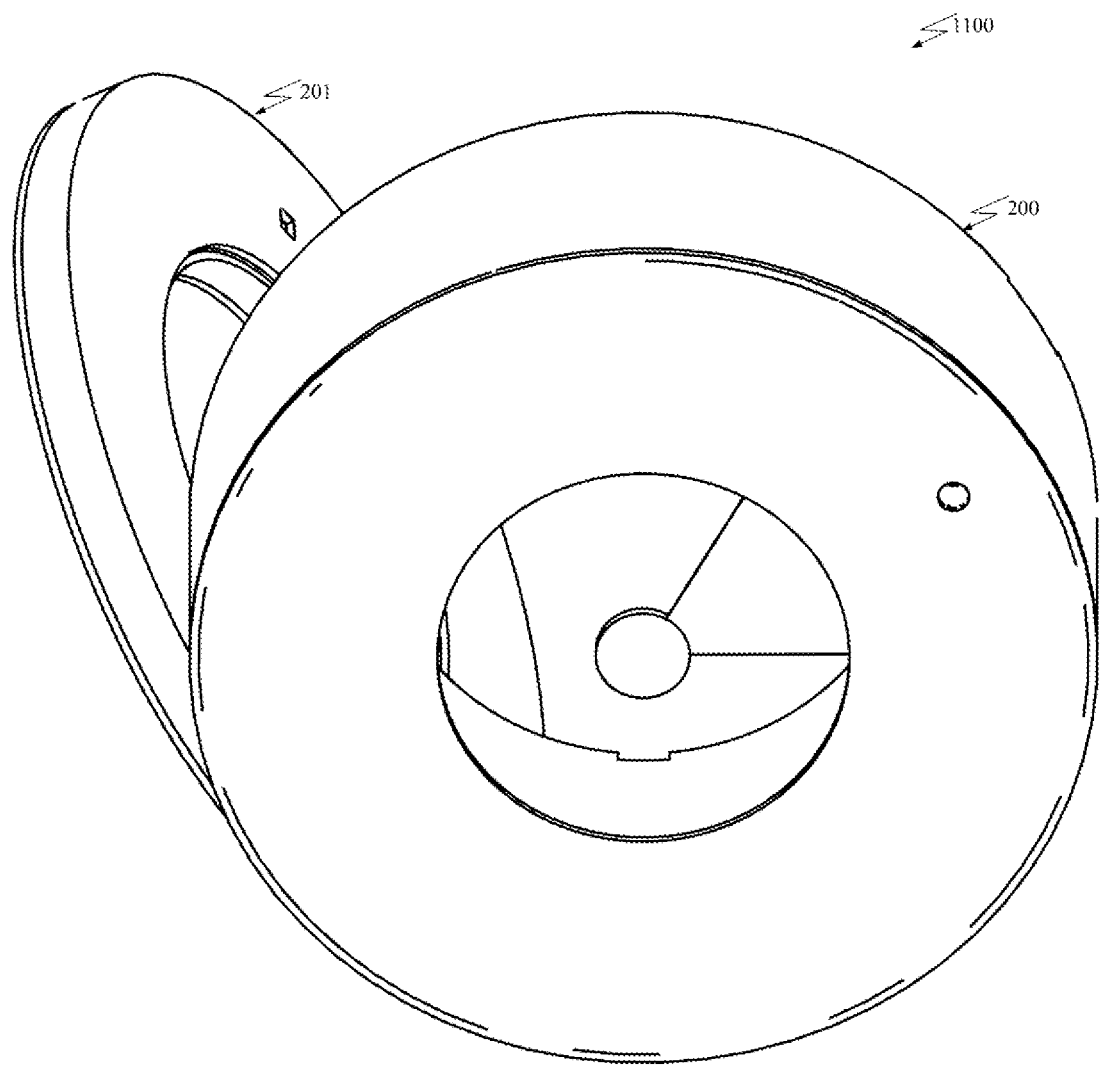
FIG. 11 is an underside view of the top section showing central ventilation column.

FIG. 11 shows one embodiment 1100. FIG. 11 shows a bottom view of the top section 200 with its lid 201 open.

Figure 12:
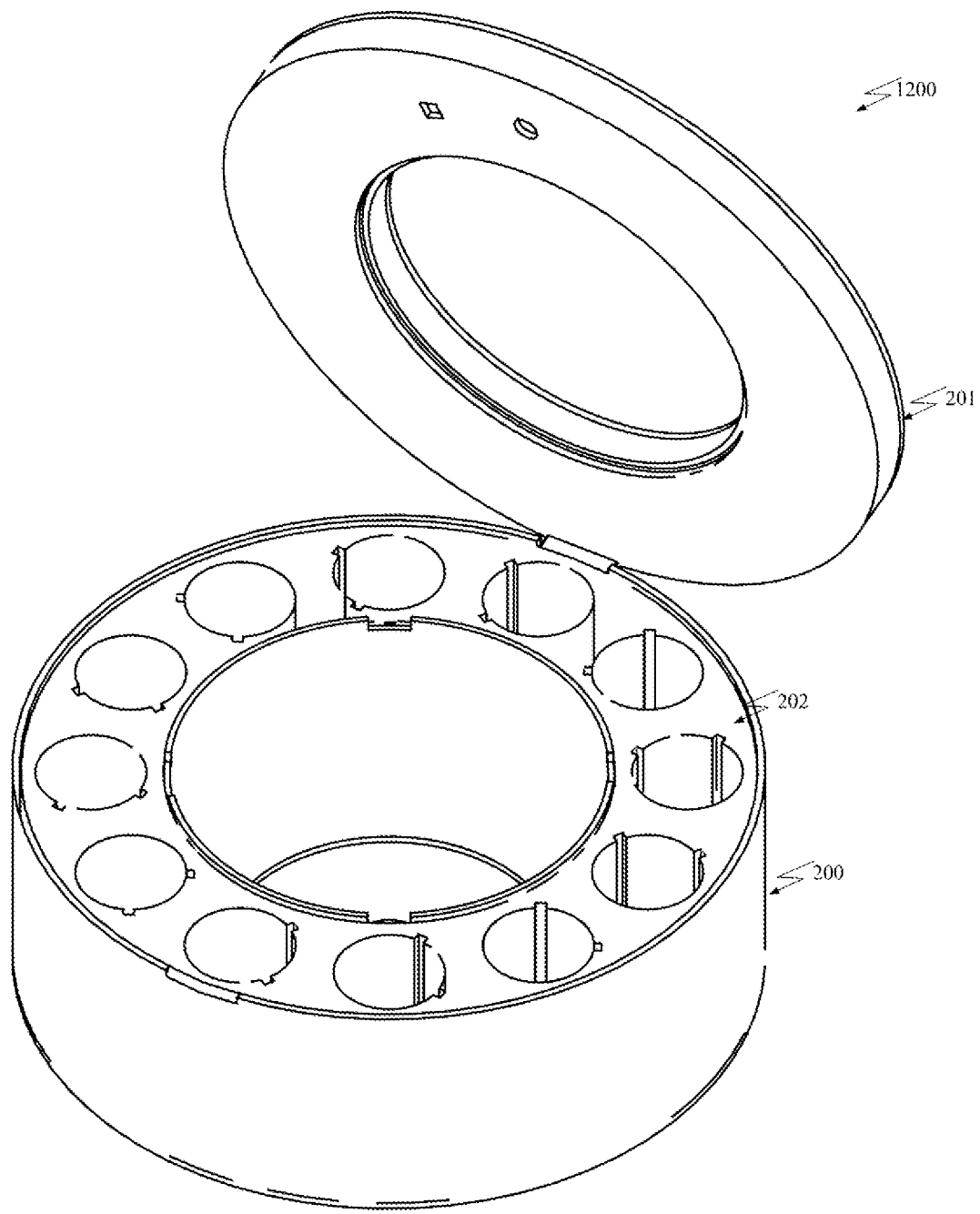
FIG. 12 is a view of just the spice/sauce compartment with its annular lid.

FIG. 12 shows one embodiment of the spice rack of the invention 1200. The spice rack 202 is preferably included in the top section 200 where it can be placed for dispensing different spices as per the recipe. The top section 200 has a lid 201 that when closed preferably seals the spice rack 202. A mechanical mechanism may be provided for rotating the spice rack to dispense the right spice. A spice recognition system may also be provided for identifying the right spice. The raw ingredient storage compartment may be placed in the center of the spice rack.

The spice rack 202 preferably has removable spice/sauce cartridges that have a spice dispensing mechanism which is computer controlled for the precise measurement and dispensing of the spice in the right amount and at the right time when automatically preparing a meal.

Figure 13:
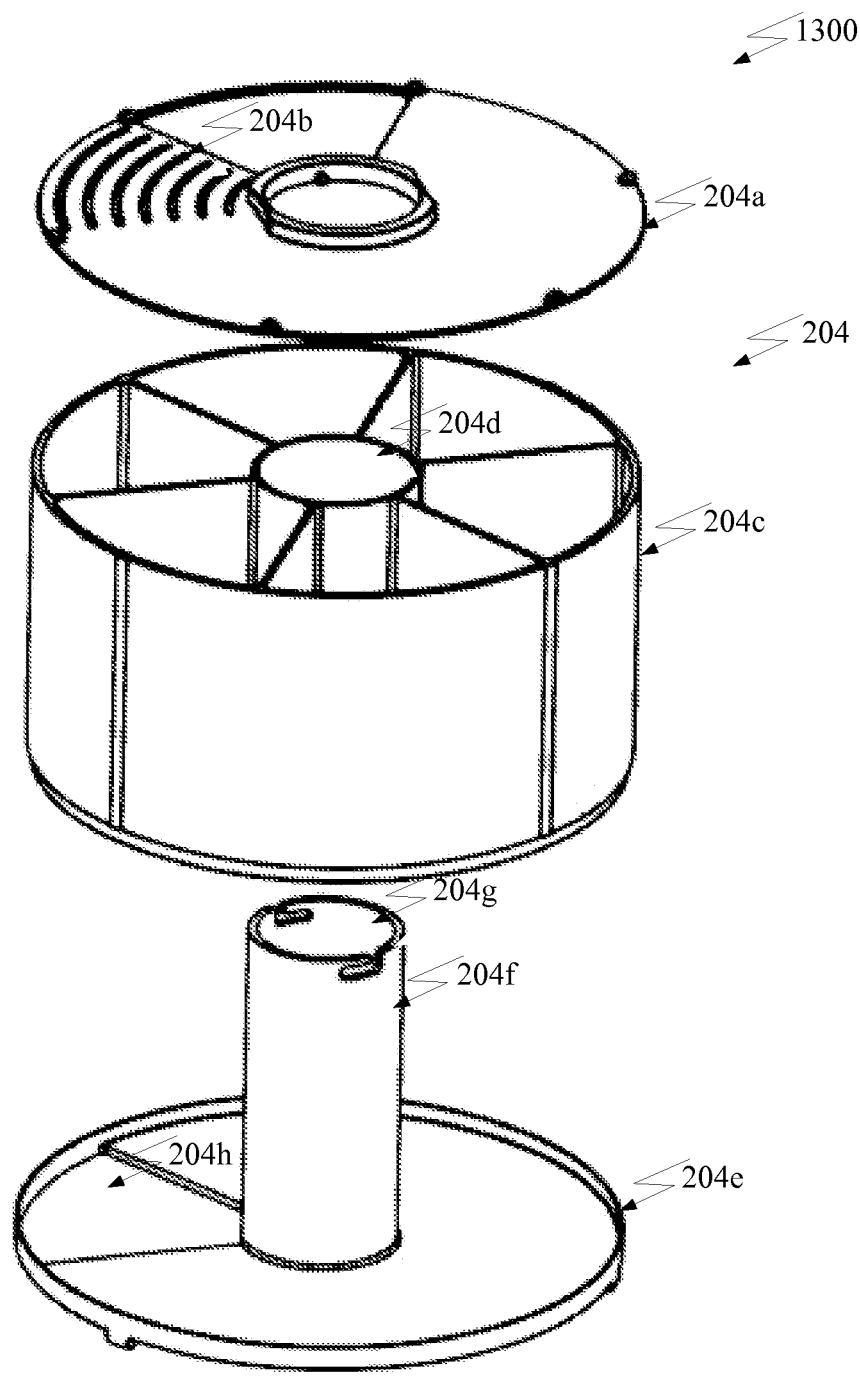
FIG. 13 is a perspective view of the raw food compartment showing segments.

FIG. 13 shows one embodiment of the raw ingredients rack 1300. The raw ingredients rack 204 is a sub-component of the top section 200. The raw ingredients rack 204, as shown, may have more than one sub-compartments for placement of individual raw food items before cooking. The sub-compartments are selectively emptied into the cooking pot or vessel as per the recipe. The raw ingredients rack has a top lid 204a that has an opening 204b for placing raw ingredients in the raw ingredients rack 204. The raw ingredients rack 204 has an outer wall 204c, an inner cylindrical cavity 204d. The raw ingredients rack 204 has a bottom lid 204e that holds the raw ingredients in and an opening 204h from where the raw ingredients are dispensed into the cooking vessel. The raw ingredients rack 204 also has a hollow cylindrical tube 204f that fits into the inner cylindrical cavity 204d, which allow for the steam to exhaust as the raw ingredients are cooked.

In one embodiment the raw ingredient rack 204 has a circular shape that is divided into several individual sub-compartments shaped like wedges. The raw ingredient rack 204 may have a different shape and the sub-components may be shaped accordingly.

A rotatable mechanism may be provided for rotating the raw ingredients rack 204 so that the raw food ingredients from the individual sub-compartments are dispensed into the cooking pot or vessel with the right timing according to the recipe selected by a user.

Figure 14:
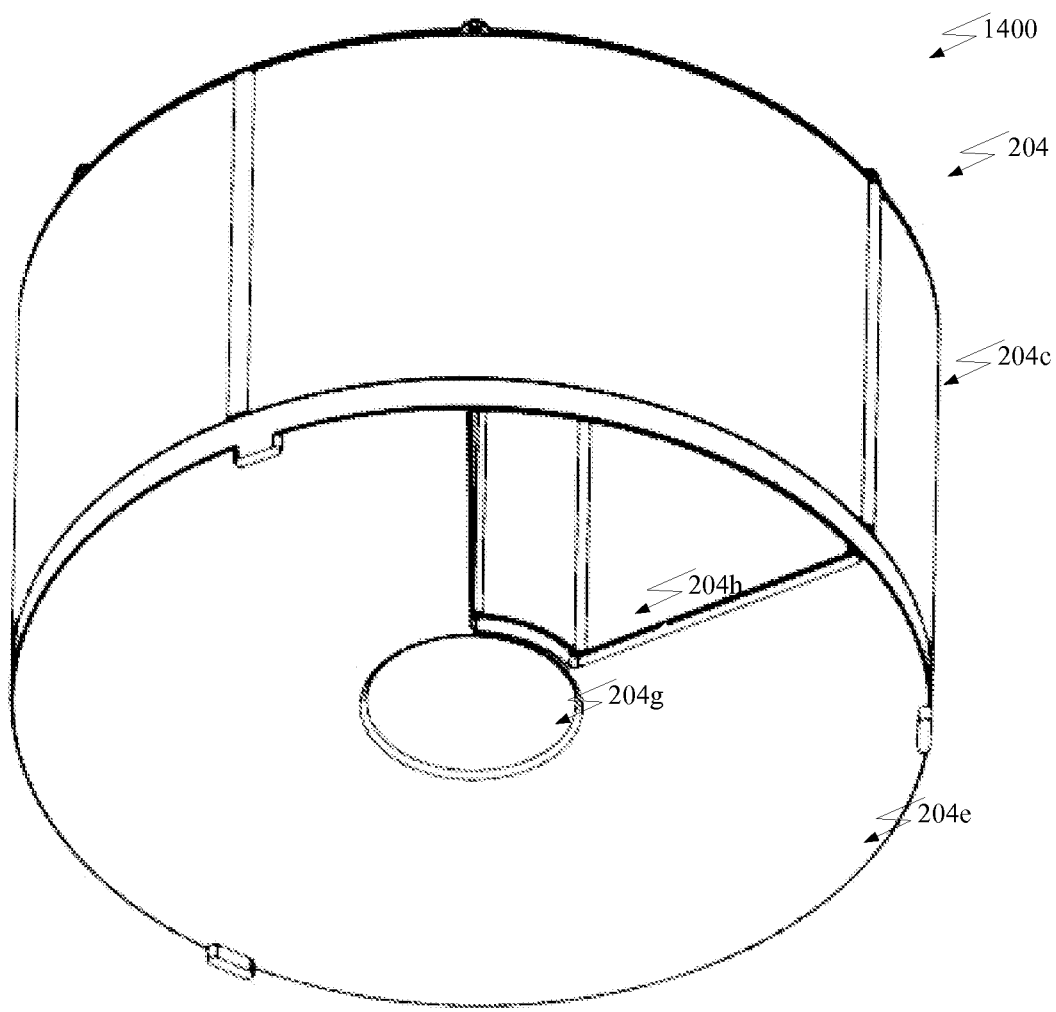
FIG. 14 is an underside view of the raw food compartment showing dispensing window.

FIG. 14 shows a bottom view 1400 of the raw ingredient rack 204 of the invention. FIG. 14 shows the raw ingredients rack taken out of the top section 200. It shows the outer wall 204c of the raw ingredients rack 204. The bottom lid 204e has an opening 204h for dispensing the raw ingredients into the cooking vessel. The figure also shows the bottom opening 204g of the cylindrical tube 204f that allows for the steam to vent as the raw ingredients are cooked.

Figure 15:
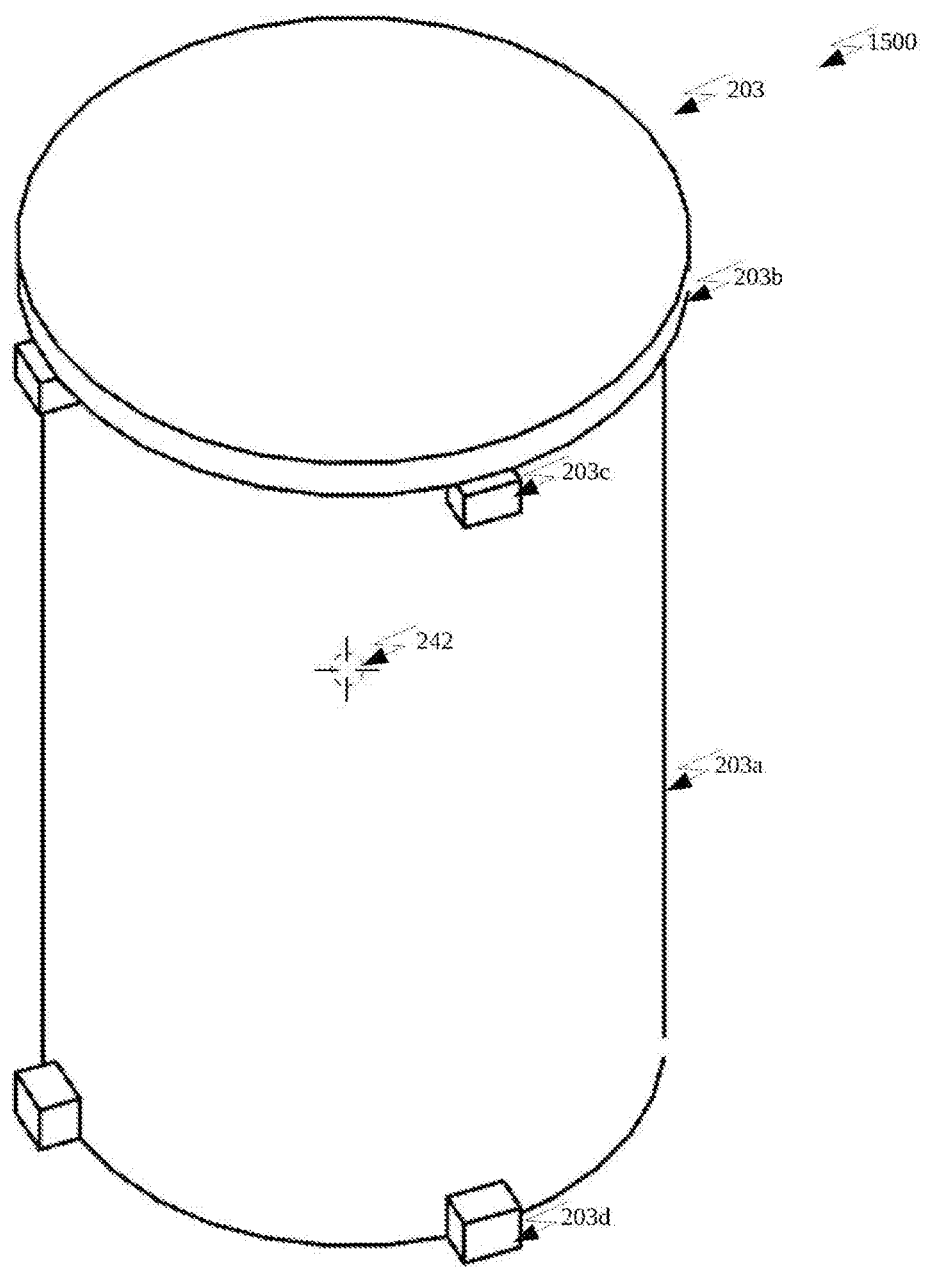
FIG. 15 is a front view of a spice/sauce cartridge for use in the spice/sauce compartment shown in FIG. 10.

FIG. 15 shows a top down view 1500 of the spice/sauce cartridge 203. The spice/sauce cartridges are preferably cylindrical in shape so that they can be removably inserted into the spice rack. Each spice/sauce cartridge has an outer wall 203a, a top lid 203b that may be sealed so that the user does not have access to the spice, one or more ridges 203c and 203d acting as locating features to keep the spice cartridge in place and prevent it from moving once it is placed inside the spice rack. Cartridges 203 may also have readable codes 242 that can be scanned to identify the spice or sauce.

Figure 16:
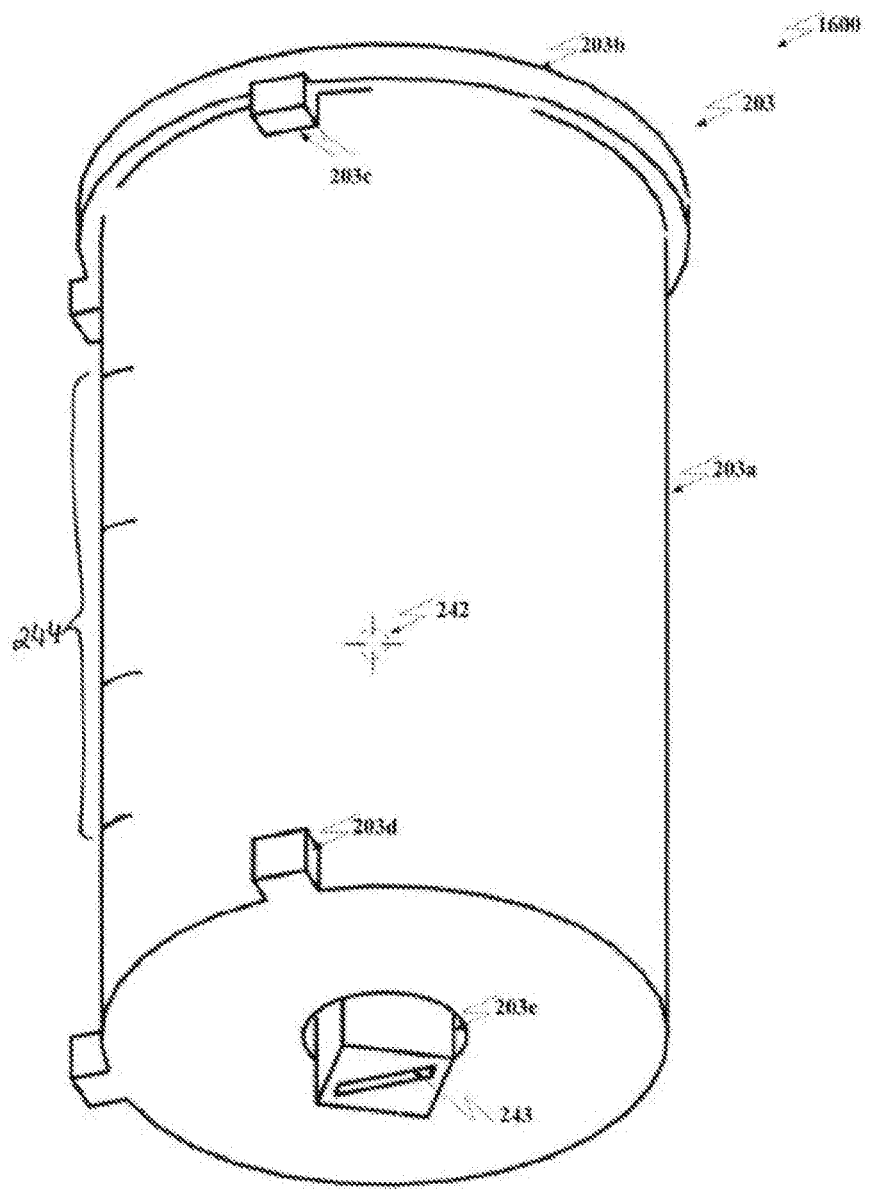
FIG. 16 is an underside view of the spice/sauce cartridge showing release/dispensing valve.

FIG. 16 shows a bottom up view 1600 of the spice/sauce cartridge 203. Each spice/sauce cartridge has an outer wall 203a, a top lid 203b that may be sealed so that the user does not have access to the spice, one or more ridges 203c and 203d to keep the spice a cartridge in place and prevent it from moving once it is placed inside the spice rack. The bottom of each spice/sauce cartridge has an opening or outlet 203e and a mechanism (e.g. valve) to dispense the spice from a valve 243 of the selected spice/sauce cartridge into the cooking pot or vessel.

Each spice/sauce cartridge is removable from the spice rack, and the apparatus preferably has a computer controlled mechanism for selecting a spice/sauce cartridge and a mechanism for spice dispensing for the precise measurement and dispensing of the spice in the right amount and at the right time when automatically preparing a meal. Divisions or portions 244 may be provided to mark or physically separate dispensable measures of the spice or sauce.

Figure 17:
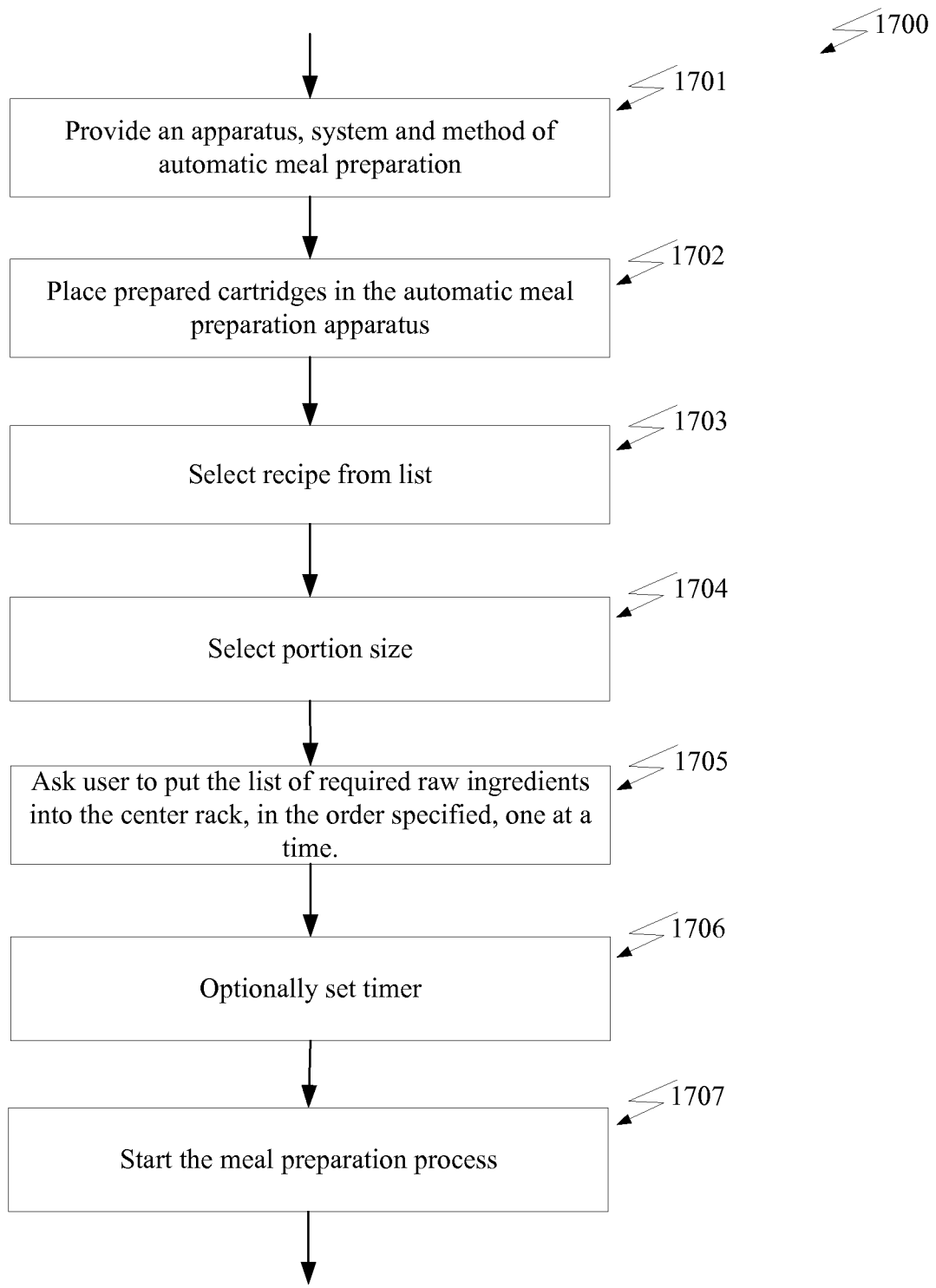
FIG. 17 is a flow diagram of an embodiment of the method of using the meal preparation apparatus.

FIG. 17 shows one embodiment of the method 1700. An apparatus, system and method is provided for automatic meal preparation 1701. The automatic meal preparation apparatus is preferably computer assisted for controlling the time of cooking, intensity of heat, amount of spices, combination of spies, timing when individual raw ingredients are added to the cooking pot etc.

Prepared cartridges are placed in the automatic meal preparation apparatus 1702. This is part of the general setup of the apparatus and need not be repeated for each cooking episode. The cartridges are preferably sized to contain multiple doses of spice/sauce that can be dispensed over multiple cooking episodes.

Prior to each cooking episode, a recipe is selected from a list 1703. For example, the recipe may be selected using a user interface that may be driven by controls like buttons on the automatic meal preparation apparatus. It may also be possible to filter the recipe choices by inputting specific fresh ingredients that the user has on hand (or in the refrigerator). For instance, it may be possible to input this on-hand inventory information by the user taking a photograph of the user's refrigerator contents using a smartphone in communication with the apparatus. It may also be possible to filter the recipe choices based on the spice/sauce cartridges remaining in the machine, and their respective quantities of remaining spice/sauce.

In one embodiment the apparatus may be able to interact with an app installed on a device. Such devices may include but are not limited to a mobile device for example a Smartphone, tablet, personal data assistant (PDA), game device, e-reader, a personal computer, a server, a laptop, a tablet computer, network appliance, set-top box, SmartTV, embedded device, computer expansion module, any appliances having internet or wireless connectivity.

The portion size may be selected 1704, e.g. meal for 2 persons.

The user may be asked to put the list of required raw ingredients into the raw ingredient rack, in a specified order, one at a time 1705.

The user may be able to set a delay timer 1706 so that the meal can be prepared at a later time. For example the user may direct the apparatus to prepare the meal in 2 hours or for 6 pm in the evening.

The meal preparation process starts 1707 once the user has executed the steps necessary for the chosen recipe.

Figure 18:
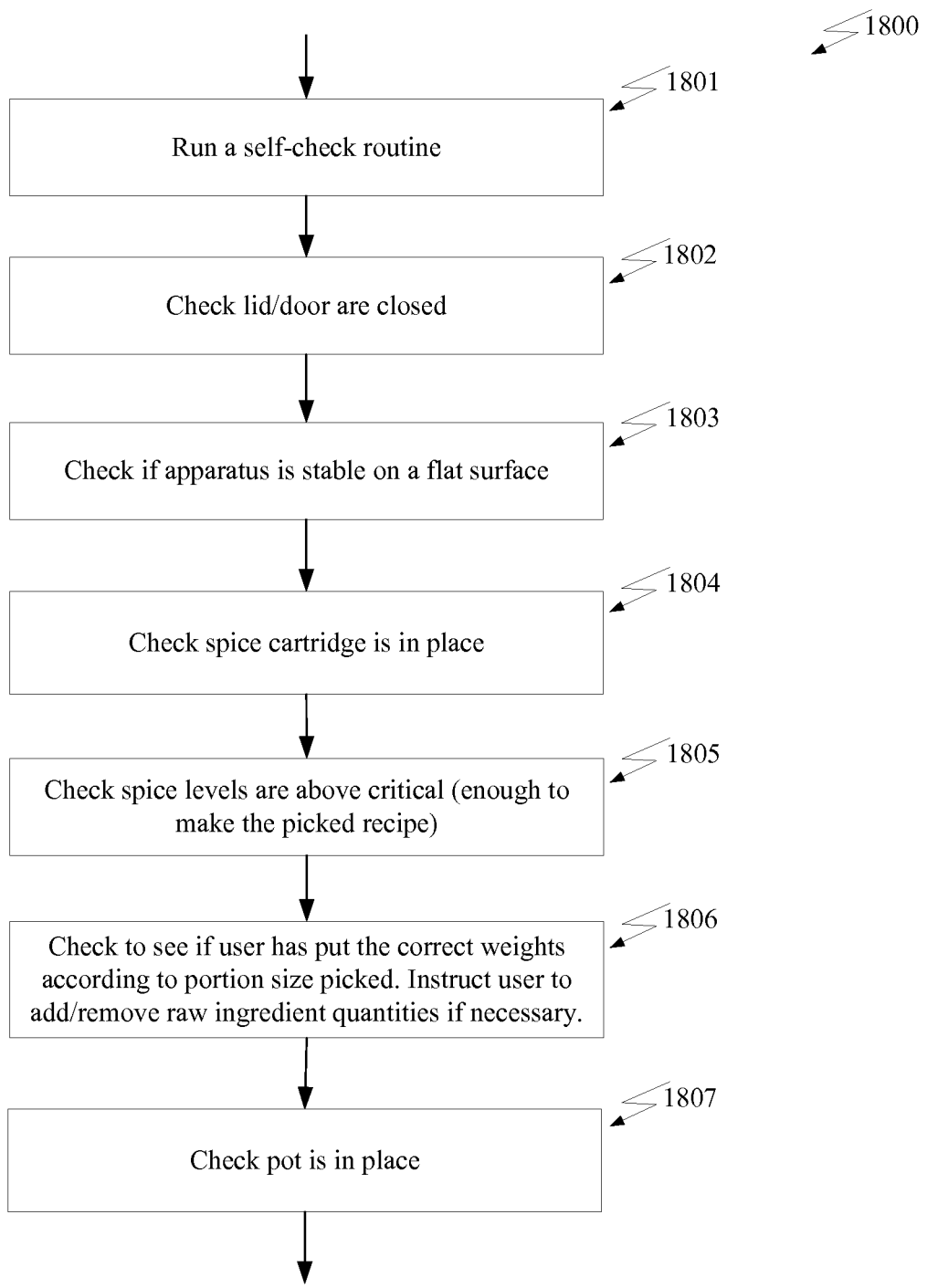
FIG. 18 is a flow diagram of self-check routines for the meal preparation apparatus.

FIG. 18 shows the self-check steps taken by the automatic meal preparation apparatus in one embodiment 1800. The apparatus runs a self-check routine 1801. Some exemplary steps of a self-check routine are provided below:
  check that lid/door are closed 1802
  check if apparatus is stable on a flat surface 1803
  check spice/sauce cartridge is in place 1804
  check spice levels are above critical (enough to make the chosen recipe and portion size) 1805
  check to see if user has put the correct weights according to portion size picked, and instruct user to add/remove raw ingredient quantities if necessary 1806
  check pot is in place 1807

Figure 19:
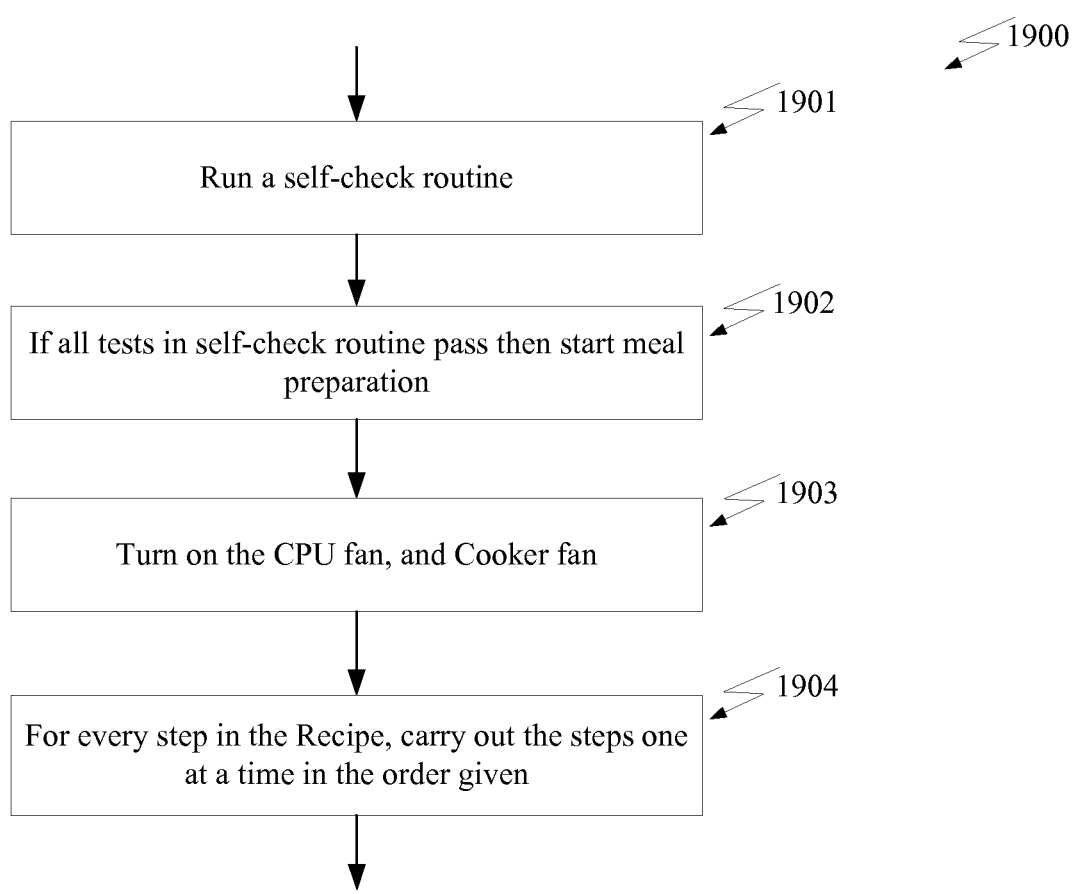
FIG. 19 is a flow diagram of heating/cooking process for the meal preparation apparatus.

FIG. 19 shows the steps taken by the automatic meal preparation apparatus for meal preparation according to one embodiment 1900.

The apparatus runs a self-check routine 1901 (as described earlier).

If all of the tests in the self-check routine pass, then the meal preparation is started 1902.

The CPU fan, and ventilation fan are turned on 1903.

For every step in the recipe, the dispensing and cooking steps are carried out one at a time in the order given 1904. For example, the step commands may include:
  changing the cooking temperature to x degrees;
  turning the heat off;
  stirring for x seconds using a pattern y (patterns may include predetermined algorithms suitable for use in, for example, soups, stir fry, etc.);
  adding x amount of y spice;
  adding the next fresh ingredient;
  adding x amount of water; or
  changing the ventilation x %.

Figure 20:
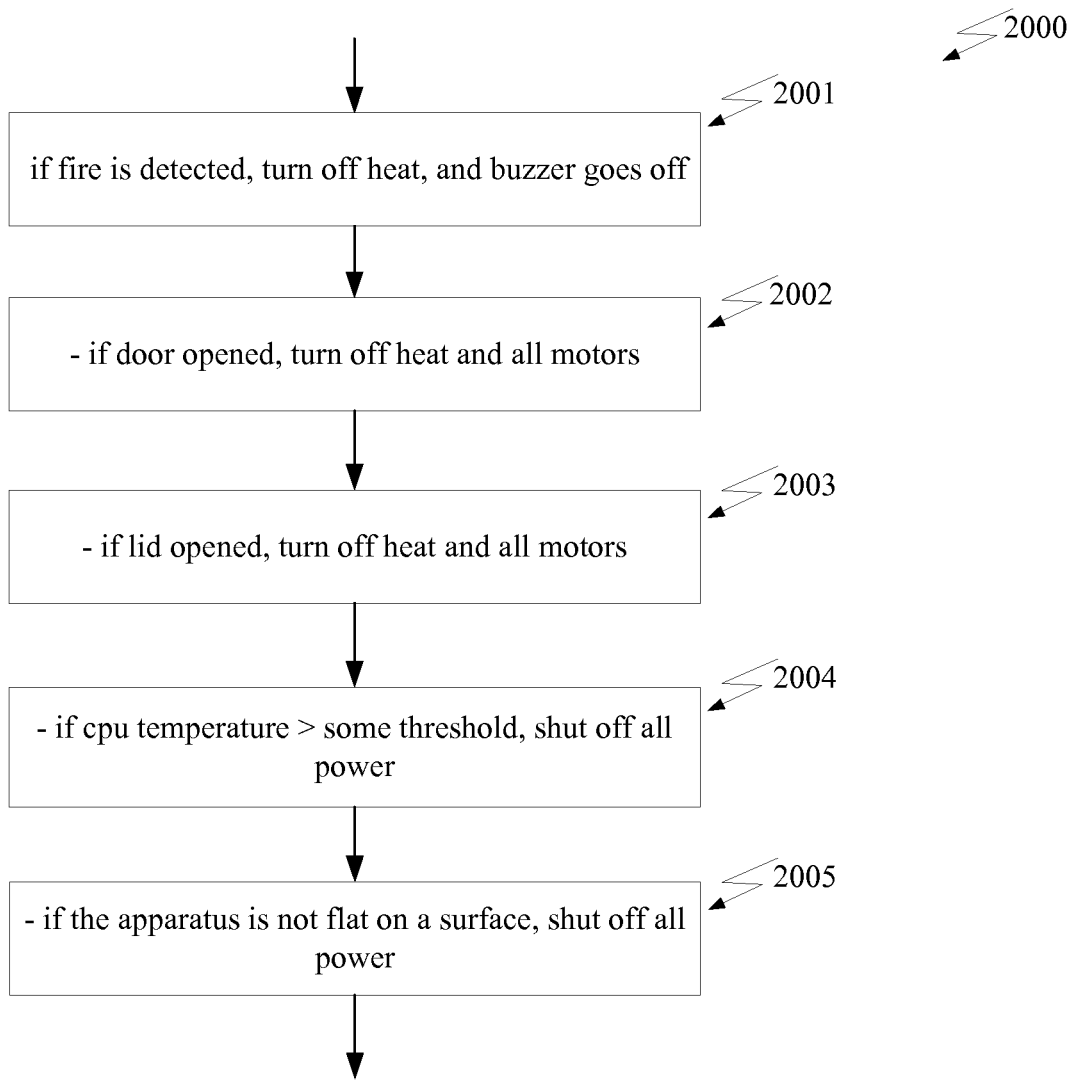
FIG. 20 is a flow diagram of error/override conditions leading to shutoff.

FIG. 20 shows the steps for the safety monitoring process, preventative steps and notification to the user according to one embodiment 2000. If one or more conditions that are considered unsafe or adverse for the automatic meal preparation apparatus are sensed or encountered, preventative steps can be taken and the user can be notified accordingly.

If fire is detected, turn off heat, and sound a buzzer 2001.

If door is open, turn off the heat and all motors 2002. A buzzer may also be sounded to notify the user.

If lid is open, turn off the heat and all motors 2003.

If the CPU temperature is greater than a given threshold, shut off all power 2004. This is to prevent fires and damage to the CPU and other electronic components.

If the apparatus is not flat on a surface, shut off all power 2005. Alternatively, if a pot is not detected turn off stirring and heat.

Figure 21:
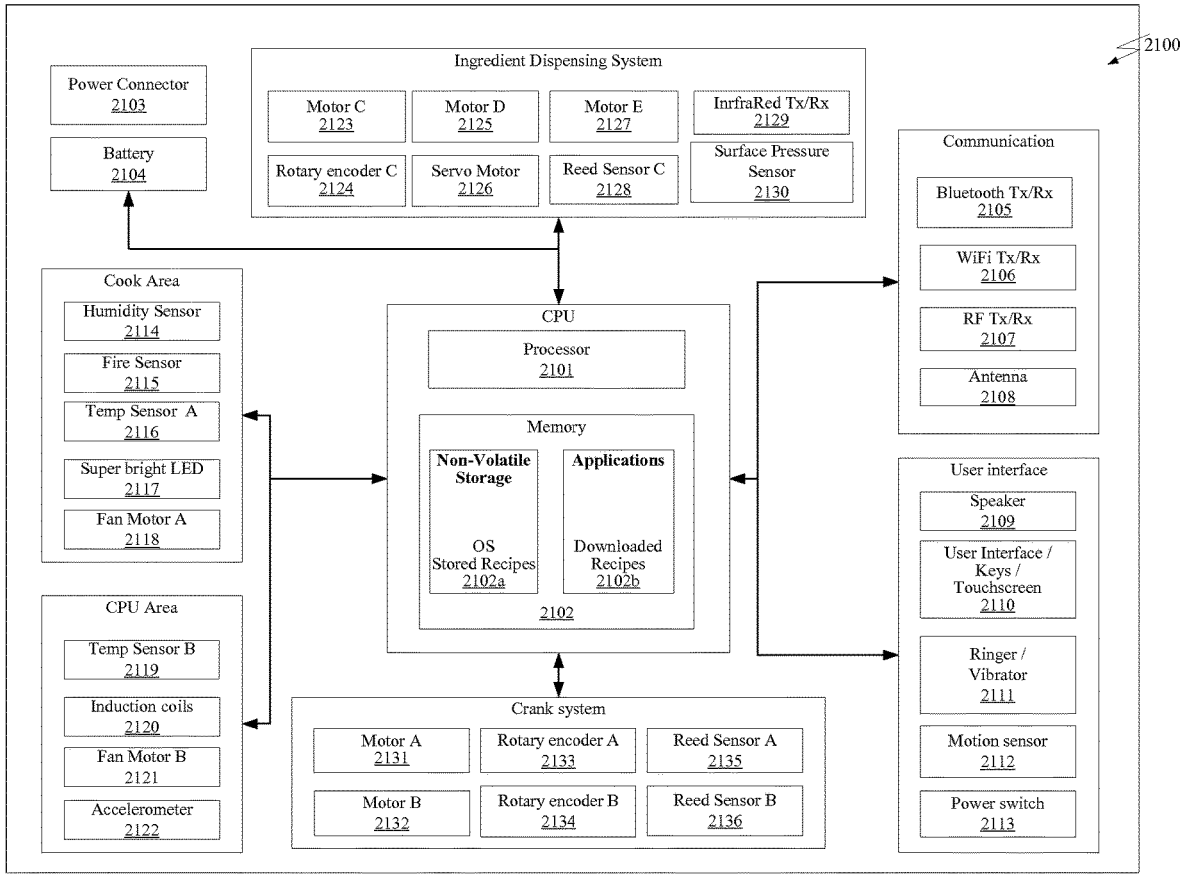
FIG. 21 is a functional block diagram of the controller and its systems.

FIG. 21 depicts an exemplary block diagram of an automatic meal preparation device 2100. Exemplary electronic circuitry of a typical automatic meal preparation device is shown. Other embodiments or other models of the automatic meal preparation device may differ by either omitting or including electronic components not shown here. The automatic meal preparation device 2100 includes in its controller 240 one or more microprocessors 2101, which is electronically coupled to other electronic components such as memory 2102 (e.g., non-volatile memory such as ROM and volatile memory such as RAM) which stores processor-readable code which is executed by one or more processors of the control processor 2101 to implement the functionality described herein.

Automatic meal preparation device 2100 may include, for example, processors 2101, memory 2002 including non-volatile storage 2102a for storing OS and built-in or already stored recipes and a memory area for storing applications and downloaded recipes 2102b e.g. space for storing new recipes that may be acquired from other connected devices for example a mobile phone, a tablet or the like. The processor 2101 can implement any number of different recipes from a wide selection of cuisines and from the user interaction with the interface of the automatic meal preparation apparatus 2100. Memory 2102 can be any variety of memory storage media types, including non-volatile and volatile memory. A device operating system (OS) handles the different operations of the automatic meal preparation apparatus 2100 and may contain user interfaces for selecting a recipe, and then preparing a meal based on the recipe, as well as running a self-check diagnostics to ensure that all components and sub-components of the automatic meal preparation apparatus 2100 are functioning as required before initiating a meal preparation process.

A physical power connector 2103 provides power to the automatic meal preparation apparatus 2100 and can be connected to an external power source, such as an AC adapter.

A battery 2104 provides a power source to operate the different electronic components in the automatic meal preparation apparatus 2100 when it is not connected to a wall outlet e.g. to power an internal clock. An electric battery is a device consisting of one or more electrochemical cells that convert stored chemical energy into electrical energy. The battery 2104 may be a rechargeable battery.

The processor 2101 also preferably communicates with Bluetooth transmitter/receiver circuitry 2105. Bluetooth is a standard wire-replacement communications protocol primarily designed for low power consumption, with a short range. Bluetooth provides a secure way to connect and exchange information between devices such as mobile phones, laptops, personal computers etc. A Bluetooth-enabled mobile device is able to pair with many other devices for communications.

The processor 2101 also preferably communicates with optional WiFi transmitter/receiver circuitry 2106. WiFi is a technology that allows an electronic device to exchange data or connect to the internet wirelessly using radio frequencies. Thus the embedded WiFi transmitter/receiver circuitry 2007 in the automatic meal preparation apparatus 2100 allows it to connect to the internet for downloading more recipes.

The processor 2101 controls transmission and reception of the different RF (radio frequency) transmitter and receiver 2107, while the antenna 2108 transmits and receives radio frequency signals from external sources.

A speaker 2109 is a device that converts electrical signals into sound. A speaker on an automatic meal preparation apparatus is used for communicating messages to the user. A recorded voice signal is provided to the speaker 2109 while other signals are also processed appropriately by other output devices.

User interface/touchscreen/buttons/keys 2110 are among the many different methods for receiving input from a user and converting this input into the appropriate electrical signals to be processed by the processor 2101.

A buzzer/ringer/vibrator 2111 is used for alerting a user of any communications e.g. when the meal is fully prepared, or when there is an emergency etc. The buzzer/ringer/vibrator 2111 is used to signal an emergency shut down or to announce other unplanned scenarios to the user.

Motion sensor 2112 may be used to detect movement near the cooking apparatus. Such sensors can be used to identify whether someone is supervising, or monitoring the cooking process. The motion sensor 2112 may also be used to provide an input signal to lighting (2117), or act as a trigger for software programs to execute certain routines.

Power switch 2113 is a physical switch that turns the power to the automatic meal preparation apparatus on and off.

A humidity sensor 2114 is a device for sensing and measuring the relative humidity or presence of moisture in the air. A capacitive humidity sensor detects humidity based on a change of capacitance between two detection electrodes provided on a semiconductor substrate.

Fire sensor 2115 is a sensor to detect any fires that may start in the automatic meal preparation apparatus. The automatic meal preparation apparatus has the intelligence to turn off all power if any fire is detected.

Temp sensor B 2116 is a sensor device for sensing and measuring temperature in the automatic meal preparation apparatus. The Temperature sensor B 2116 detects and maintains the correct temperature that is needed for cooking the ingredients of a recipe.

Super bright LED 2117 may be used to light the automatic meal preparation apparatus.

Fan Motor A 2118 is a ventilation fan that is designed to keep the humidity level in the automatic meal preparation apparatus at the correct level. In addition, this fan keeps the internal temperature regulated for cooking particular types of meals.

Temp sensor B 2119 is a sensor device for sensing and measuring temperature of the CPU of the automatic meal preparation apparatus. The Temperature sensor B 2119 detects the temperature of the CPU and may shut down power to the unit if the CPU becomes too hot. This is an example of an unsafe operating condition.

Induction coils 2120 is a coil of wire for producing induction heat for cooking a meal. The induction coil 2120 in the automatic meal preparation apparatus heats the cooking pot or vessel when meal preparation is in process. Induction heating is the process of heating an electrically conducting object (in this case the cooking pot or vessel) by electromagnetic induction, where eddy currents are generated within the material of the cooking pot.

Fan Motor B 2121 is a cooling fan that is designed to keep the CPU cool and within the operating temperature range as defined by the CPU manufacturer.

An accelerometer 2122 is a device for sensing and measuring the gravitation forces along the x, y surface plane. Using an accelerometer determines the tilt positions of the automatic meal preparation apparatus 100. If it is detected that the automatic meal preparation apparatus 100 is not placed on a flat surface then the system may be shut down to prevent damage and spills. This is another example of an unsafe operating condition.

Motor C 2123 and rotary Encoder 2124 may be used to dispense spice/sauce cartridge from a spice/sauce cartridge in the automatic meal preparation apparatus. As the Motor C 2123 rotates, and encoder measures the angle of rotation in steps, with every 60 degrees being counted. Since a complete 360 degree rotation of Motor C 2123 would equal a certain volume in mL of an ingredient being dispensed from the spice/sauce cartridge, accurate measurement of spice dispensing can be achieved by controlling the number of rotations of the Motor C 2123.

Motor D 2125 may be used to turn the spice rack and all of its spice/sauce cartridges. The Read Switch C 2128 is used to indicate when a spice/sauce cartridge is directly under the dispensing hole so that the correctly selected spice can be dispensed into the cooking pot or vessel when a meal preparation is in progress in the automatic meal preparation apparatus.

Servo Motor 2126 may be used to open and close the hole to the cooking area from the spice rack in the automatic meal preparation apparatus.

Motor E 2127 may be used to rotate the raw ingredients rack for the dispensing of the selected raw ingredient when a meal preparation is in progress in the automatic meal preparation apparatus.

Motor A 2131 provides the power to actuate the stirring arm, while the Rotary Encoder A 2133 is used for stirring arm actuator. Read Switch A 2135 may also be used to detect a default resting position.

Ventilation fan may also be a module in the controller system (not shown).

The processor 2101 also communicates with Infrared transmitter/receiver circuitry 2129. The way this technology works is that the infrared transmit component flashes an infrared light in a particular pattern, which another component (the infrared receiver) can pick up and translate into an instruction. These transmitters and receivers are also typically found in remote controls and are now embedded in mobile devices that can turn them into remote control devices. They typically generate infrared using light emitting diodes (LEDs), and the main component of a receiver unit may be a photodiode.

Other signals may also be processed appropriately by the CPU 2101 and outputs directed to other output devices not listed here e.g. a red flashing LED or a steadily lit green LED to indicate different stages of the meal preparation process.

The examples noted here are for illustrative purposes only and may be extended to other implementation embodiments. While a presently preferred embodiment is described here, there is no intent to limit the disclosure to the embodiment disclosed herein. On the contrary, the intent is to cover all practical alternatives, modifications, and equivalents.

What is claimed is:

1. An automatic meal preparation apparatus, comprising:
a housing comprising:
a top section having:
a first compartment for receiving raw food to be prepared, the first compartment having segments in a ring disposed around a central ventilation column; and
a second compartment that is an outer concentric ring around the first compartment;
a plurality of spice/sauce cartridges in the second compartment and isolated from the central ventilation column by the segments of the first compartment, each spice/sauce cartridge having:
a cylindrical or tapered cylindrical body pre-filled with a spice or sauce, the body having an open top;
a lid or seal substantially covering the open top of the body; and
a dispensing outlet on a bottom surface of the body;
a middle section having a cooking vessel, and a stirring arm disposed in the cooking vessel;
a bottom section having a heating element and an actuator for driving the stirring arm; the top, middle and bottom sections being stacked in series within the housing, such that the compartments of the top section are disposed above the cooking vessel and are in selective communication therewith, and the cooking vessel is in communication with the heating element of the bottom section; and
a controller in the housing that is programmed to receive a selection of a recipe from a user, and execute instructions of the recipe for selectively heating the heating element at pre-determined times, selectively dispensing at least a portion of the raw food by releasing it from the first compartment into the cooking vessel at a pre-determined time, dispensing a pre-determined measure of spice/sauce from at least one of the plurality of spice/sauce cartridges by releasing the pre-determined measure from the second compartment into the cooking vessel at a pre-determined time, and stirring and cooking the food and the spice/sauce in the vessel for a specified duration, in accordance with the recipe,
wherein the first compartment comprises a top lid with an opening for selectively loading the segments with the raw food and a bottom lid with an opening for selectively dispensing the raw food into a cooking vessel.

2. The apparatus of claim 1, wherein the plurality of spice/sauce cartridges are removable from the second compartment or replaceable.

3. The apparatus of claim 1, wherein the plurality of spice/sauce cartridges are pre-filled.

4. The apparatus of claim 1, wherein the measure is selectable by the user.

5. The apparatus of claim 1, wherein the first compartment has multiple segments, each segment having space for receiving a different raw food.

6. The apparatus of claim 5, wherein the food in each segment is separately dispensable into the cooking vessel.

7. The apparatus of claim 1, further comprising a water tank or reservoir in the housing, in communication with the cooking vessel.

8. The apparatus of claim 1, wherein at least one of the first or second compartments is rotatable for better alignment with the cooking vessel.

9. The apparatus of claim 1, wherein the cooking vessel is rotatable for better alignment with the first or second compartment to be dispensed.

10. The apparatus of claim 1, wherein at least one of the top, middle and bottom section is ventilated.

11. The apparatus of claim 10, wherein the ventilation is assisted.

12. The apparatus of claim 1, further comprising an access door on the middle section.

13. The apparatus of claim 12, further comprising an access lid on the top section.

14. The apparatus of claim 13, wherein the access lid includes a fan.

15. The apparatus of claim 13, wherein at least one of the access door or access lid is locked while cooking is in progress.

16. The apparatus of claim 1, wherein the cooking vessel has a handle.

17. The apparatus of claim 16, wherein the handle is anchorable with the middle section or the bottom section.

18. The apparatus of claim 1, wherein the actuator includes a motor for actuating the stirring arm.

19. The apparatus of claim 1, wherein the heating element is an induction element, and the cooking vessel includes an induction-compatible material.

20. The apparatus of claim 1, wherein each of the spice/sauce cartridges further comprise a readable code on the body that is readable by the apparatus to identify the spice or sauce.

21. The apparatus of claim 1, wherein the body of each of the spice/sauce cartridges includes divisions or portions sized to provide dispensable measures.

22. The apparatus of claim 1, wherein the dispensing outlet of each of the spice/sauce cartridges includes a valve calibrated to release a measure or sub-measure quantity of the spice or sauce at a time.

* * * * *